US012726387B2

(12) United States Patent
Xu et al.

(10) Patent No.: US 12,726,387 B2
(45) Date of Patent: Sep. 1, 2026

(54) SIGNAL PROCESSING METHOD AND APPARATUS

(71) Applicant: HUAWEI TECHNOLOGIES CO., LTD., Shenzhen (CN)

(72) Inventors: Chen Xu, Hangzhou (CN); Gongzheng Zhang, Hangzhou (CN); Jian Wang, Hangzhou (CN); Rong Li, Boulogne Billancourt (FR); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 18/902,430

(22) Filed: Sep. 30, 2024

(65) Prior Publication Data

US 2025/0023762 A1 Jan. 16, 2025

Related U.S. Application Data

(63) Continuation of application No. PCT/CN2023/085029, filed on Mar. 30, 2023.

(30) Foreign Application Priority Data

Mar. 31, 2022 (CN) ......................... 202210338001.1

(51) Int. Cl.
*H04L 25/03* (2006.01)
*H04L 25/02* (2006.01)

(52) U.S. Cl.
CPC .... *H04L 25/03006* (2013.01); *H04L 25/0254* (2013.01); *H04L 2025/03464* (2013.01)

(58) Field of Classification Search
CPC ........... H04L 25/03006; H04L 25/0254; H04L 2025/03464; H04L 1/0003; H04L 1/0009;
(Continued)

(56) References Cited

U.S. PATENT DOCUMENTS

2020/0092319 A1* 3/2020 Spisak ..................... G06N 7/01

OTHER PUBLICATIONS

Songyan Xue et al: “A Modular Neural Network Based Deep Learning Approach for MIMO Signal Detection”, arxiv.org, Cornell University Library, 201 Olin Library Cornell University Ithaca, NY 14853, Apr. 1, 2020 (Apr. 1, 2020), XP081634009, total 12 pages.

(Continued)

*Primary Examiner* — Fitwi Y Hailegiorgis

(57) ABSTRACT

Embodiments of this application relate to the field of wireless communication technologies, and provide a signal processing method and an apparatus, to improve signal processing performance. In this method, a communication apparatus inputs N1 signal vectors to an input layer of a neural network for dimension increase processing, to obtain N2 high-dimensional signal vectors. The communication apparatus inputs the N2 high-dimensional signal vectors to an interaction layer of the neural network, to obtain a feature between the N2 high-dimensional signal vectors and a feature of each high-dimensional signal vector. The communication apparatus inputs the feature between the N2 high-dimensional signal vectors and the feature of each high-dimensional signal vector to an output layer of the neural network for an operation, to obtain an output signal vector.

20 Claims, 16 Drawing Sheets

(58) Field of Classification Search
CPC ... H04L 1/0026; H04L 1/0054; H04L 1/0076; H04L 25/03891; G06N 3/0499; G06N 3/0464; G06N 3/045; G06N 3/08; H04B 7/0413
USPC .......................................................... 375/260
See application file for complete search history.

(56) References Cited

OTHER PUBLICATIONS

Jiang Hao et al: "Attention-Based Hybrid Precoding for mmWave MIMO Systems", 2021 IEEE Information Theory Workshop (ITW), IEEE, Oct. 17, 2021 (Oct. 17, 2021), XP034028532, total 6 pages.
Sainbayar Sukhbaatar et al:"End-To-End Memory Networks." arXiv:1503.08895v5 [cs.NE] Nov. 24, 2015. total 11 pages.
Ashish Vaswani et al:"Attention Is All You Need." arXiv:1706.03762v5 [cs.CL] Dec. 6, 2017. total 15 pages.
Mikko Honkala et al:"DeepRx: Fully Convolutional Deep Learning Receiver." arXiv:2005.01494v2 [eess.SP] Jan. 12, 2021. total 32 pages.
Hao Ye et al:"Deep Learning based End-to-End Wireless Communication Systems without Pilots." Feb. 23, 2021. total 13 pages.
E. A. Nadaraya et al:"On Estimating Regression." 1964. total 2 pages.

* cited by examiner

SIGNAL PROCESSING METHOD AND APPARATUS

CROSS-REFERENCE TO RELATED APPLICATIONS

This application is a continuation of International Application No. PCT/CN2023/085029, filed on Mar. 30, 2023, which claims priority to Chinese Patent Application No. 202210338001.1, filed on Mar. 31, 2022. The disclosures of the aforementioned applications are hereby incorporated by reference in their entireties.

TECHNICAL FIELD

This application relates to the field of wireless communication technologies, and in particular, to a signal processing method and an apparatus.

BACKGROUND

Artificial intelligence technologies have been successfully applied in fields of image processing and natural language processing, and increasingly mature artificial intelligence technologies will play an important role in promoting the evolution of mobile communication network technologies. Currently, the artificial intelligence technologies are mainly applied to a network layer, a physical layer, and the like.

For the artificial intelligence technology at the physical layer, including modules at the physical layer, for example, modules for signal processing such as coding, modulation, multiple-input multiple-output precoding, and beamforming are mostly replaced by using the artificial intelligence technology. Main advantages of the artificial intelligence technology are reducing an operation delay, improving algorithm performance, and the like. However, for the modules at the physical layer, performance achieved by an independent optimization algorithm of each module is close to an upper bound of the performance. Therefore, a gain obtained through only module replacement is limited.

SUMMARY

Embodiments of this application provide a signal processing method and an apparatus, to improve signal processing performance.

According to a first aspect, a signal processing method is provided. The method may be performed by a communication apparatus, or may be performed by a chip having a function similar to that of a communication apparatus. The communication apparatus may be a network device or a terminal device. In this method, the communication apparatus maps an input signal to N1 resource patches (RPs), where the RP includes one or more resource elements (REs), and each RP includes one signal vector determined based on the input signal. The communication apparatus inputs N1 signal vectors to an input layer of a neural network for dimension increase processing, to obtain N2 high-dimensional signal vectors. The communication apparatus inputs the N2 high-dimensional signal vectors to an interaction layer of the neural network, to obtain a feature between the N2 high-dimensional signal vectors and a feature of each high-dimensional signal vector. The communication apparatus inputs the feature between the N2 high-dimensional signal vectors and the feature of each high-dimensional signal vector to an output layer of the neural network for an operation, to obtain an output signal vector.

According to the foregoing solution, the feature of each signal vector and the feature between the signal vectors are obtained via the interaction layer. Because the feature of the signal vector and the feature between the signal vectors are independent of a dimension of the signal vector, complexity of signal processing can be reduced. In addition, a quantity of signal vectors input to the interaction layer may be changed, so that scalability of signals in different dimensions can be implemented.

In an implementation, the interaction layer of the neural network includes at least one interaction module group, and each interaction module group includes a first interaction module and a second interaction module. The first interaction module is configured to obtain the feature between the N2 high-dimensional signal vectors, and the second interaction module is configured to obtain the feature of each high-dimensional signal vector. An interaction module group l includes a first interaction module l_1 and a second interaction module l_2, where $l \in L$. In the interaction module group l, input of the first interaction module l_1 is any one of the high-dimensional signal vector, output of a second interaction module l-1_2 in an interaction module group l-1, or output of a first interaction module l-1_1 in an interaction module group l-1, and input of the second interaction module l_2 is output of the first interaction module l_1. Alternatively, in the interaction module group l, input of the second interaction module l_2 is any one of the high-dimensional signal vector, output of a first interaction module l-1_1 in an interaction module group l-1, or output of a second interaction module l-1_2 in an interaction module group l-1, and input of the first interaction module l_1 is output of the second interaction module l_2.

It may be understood that a sequence of the first interaction module and the second interaction module in each interaction module group is not limited. Because a dimension of input of the interaction layer is the same as a dimension of output of the interaction layer, L layers of iterations may be performed at the interaction layer. In other words, L interaction module groups may be connected to each other, so that the L layers of iterations are performed at the interaction layer.

According to the foregoing solution, a plurality of layers of iterations at the interaction layer are implemented via a plurality of interaction module groups, so that a performance gain of the neural network can be obtained.

In an implementation, the first interaction module includes an operation of an attention layer, and the second interaction module includes an operation of a fully connected layer.

According to the foregoing solution, independent transformation of the input signal vector is implemented. The feature between the signal vectors can be obtained via the attention layer, and the feature of each signal vector can be obtained via the fully connected layer. Regardless of a dimension of the input signal vector, the feature between the signal vectors and the feature of each signal vector can be obtained by performing the operation of the attention layer and the operation of the fully connected layer. In other words, a neural network parameter according to the foregoing solution is independent of the dimension of the input signal vector, so that scalability of the neural network is implemented. In addition, a correlation between any two signal vectors may be extracted via the attention layer, and a larger quantity of parameters can be obtained, so that the neural network can be applied to more communication scenarios.

In an implementation, an operation performed by the attention layer on the N2 high-dimensional signal vectors satisfies the following formula:

$$ATT(Q, K, V) = softmax\left(\frac{QK^T}{\sqrt{d_k}}\right)V$$

$Q=SW^Q$, $K=SW^K$, $V=SW^V$, S is input of the attention layer, $W^Q$, $W^K$, and $W^V$ are obtained through training, $d_k$ is a dimension of the high-dimensional signal vector, $^T$ represents a matrix transpose operation, and ATT(Q, K, V) represents output of the attention layer. Q, K, and V represent results obtained by performing three linear transformations on input S, Q represents a query vector, $W^Q$ represents a query vector weight, K represents a keyword vector, $W^K$ represents a keyword vector weight, V represents a value vector, and $W^V$ represents a value vector weight.

In an implementation, an operation performed by the fully connected layer on the N2 high-dimensional signal vectors satisfies the following formula:

$$y = f(xW^M + b)$$

y is the feature of each high-dimensional signal vector, f is an activation function, $W^M$ and b are obtained through training, $W^M$ represents a weight of the fully connected layer, b represents an offset of the fully connected layer, and x is input of the fully connected layer.

In an implementation, an operation performed by the first interaction module is based on a first matrix, and the first matrix is an N2×N2 matrix. An operation performed by the second interaction module is based on a second matrix, the second matrix is a $d_k \times d_k$ matrix, and $d_k$ is a dimension of the high-dimensional signal vector.

According to the foregoing solution, independent transformation of the input signal vector is implemented. The feature between the signal vectors can be obtained by using the first matrix, and the feature of each signal vector can be obtained by using the second matrix. Therefore, scalability of the neural network is implemented by expanding the matrix. In addition, a correlation between any two signal vectors may be extracted by using the first matrix, and a larger quantity of parameters can be obtained, so that the neural network can be applied to more communication scenarios.

In an implementation, elements on a main diagonal of the first matrix are the same. Elements of the first matrix other than the elements on the main diagonal are the same. Optionally, an element on the main diagonal may represent obtaining a feature of the element. In other words, the element on the main diagonal is for obtaining a feature of a signal vector, and an element other than the element on the main diagonal represents obtaining a feature between a signal vector and another signal vector. Alternatively, the first matrix is obtained through calculation based on the input N2 high-dimensional signal vectors.

According to the foregoing solution, when the elements on the main diagonal of the first matrix are the same, the first matrix can be expanded by expanding the elements on the main diagonal, to implement scalability of the neural network.

In an implementation, the interaction layer of the neural network includes a graph neural network, and the communication apparatus sets each of the N2 high-dimensional signal vectors to a state of a node in the graph neural network at a $0^{th}$ time, where each node corresponds to one high-dimensional signal vector. The feature between the N2 high-dimensional signal vectors is an aggregated state of an adjacent node of each node in the graph neural network obtained at a $Z^{th}$ time, and a state of each high-dimensional signal vector is a state of each node at the $Z^{th}$ time. It may be understood that the state of each node at the $Z^{th}$ time is obtained based on the aggregated state obtained at the $Z^{th}$ time and a state of each node at a $(Z-1)^{th}$ time, where Z is an integer greater than or equal to 1.

According to the foregoing solution, the feature between the high-dimensional signal vectors and the feature of each high-dimensional signal vector may be obtained via the graph neural network, and the obtained feature is independent of the dimension of the input signal vector, and has scalability.

In an implementation, a quantity of REs included in each RP is determined based on a computing resource available to the communication apparatus and/or a physical resource occupied by the input signal.

In an implementation, an RP configuration includes three parameters that respectively correspond to a frequency domain n_F, a time domain n_T, and a space domain n_L. The RP configuration is associated with at least one of a time domain resource, a frequency domain resource, and a space domain resource that are occupied by the input signal, and the computing resource available to the communication apparatus.

In an implementation, the RP configuration is indicated by a network device.

According to the foregoing solution, the communication apparatus may obtain configuration information of the resource patch from the network device in an uplink channel measurement phase, so that a size of each resource patch can be determined.

In an implementation, the communication apparatus sends configuration information of a recommended RP to the network device.

According to the foregoing solution, the configuration information of the RP that is obtained by the communication apparatus can better conform to an actual situation of the communication apparatus.

In an implementation, an operation performed by the interaction layer is further based on a task vector, and the task vector is for obtaining high-dimensional task information. The output signal vector further includes target task information, and the target task information is obtained based on the high-dimensional task information. Optionally, a task layer may be further set in the neural network. An operation of the task layer is for executing a task. One or more task layers may be set, and an operation of each task layer corresponds to one task.

According to the foregoing solution, the neural network may be applied to a large quantity of communication scenarios by using the task vector and the task layer, for example, scenarios such as signal-to-noise ratio estimation, terminal speed estimation, channel delay spread estimation, channel type detection, channel estimation, channel coding, or channel decoding.

In an implementation, the operation performed by the interaction layer is further based on a trainable vector, and the trainable vector is for obtaining global information of the N2 high-dimensional signal vectors. The output signal vector is determined based on the feature between the N2 high-dimensional signal vectors, the feature of each high-dimensional signal vector, and the global information.

According to the foregoing solution, prior information may be obtained for the trainable vector in a training phase, and the global information of the N2 high-dimensional signal vectors may be obtained by using the trainable vector, so that inference performance of the neural network can be improved.

In an implementation, the input signal includes data received by the communication apparatus, and the output signal vector includes a log-likelihood ratio of the data. According to the foregoing solution, when the input signal includes the data received by the communication apparatus, and the output signal vector includes the log-likelihood ratio of the data, the communication apparatus may decode the received data based on the log-likelihood ratio.

In an implementation, the input signal includes a modulation symbol, and the output signal vector includes a transmission symbol. It may be understood that a waveform may be generated when the transmission symbol passes through a waveform generation module. The communication apparatus may transmit, through an antenna, a signal corresponding to the waveform. According to the foregoing solution, when the neural network is applied to a transmitter, the input signal includes the modulation symbol, and the output signal vector includes the transmission symbol, so that the communication apparatus can implement aliasing of modulation symbols, and the transmitter can adapt to a channel.

In an implementation, the input signal includes a to-be-encoded bit, and the output signal vector includes an encoded bit or a transmission symbol. According to the foregoing solution, when the input signal includes the to-be-encoded bit, and the output signal vector includes the encoded bit, the communication apparatus may encode the to-be-encoded bit based on the foregoing neural network. When the input signal includes the to-be-encoded bit, and the output signal vector includes the transmission symbol, the communication apparatus may map the to-be-encoded bit to the transmission symbol based on the neural network.

According to a second aspect, an embodiment of this application provides a communication apparatus. The apparatus may be a terminal device or a network device, or may be a chip or a module used in a terminal device or a network device. The apparatus has a function of implementing the method according to any implementation of the first aspect. The function may be implemented by hardware, or may be implemented by hardware executing corresponding software. The hardware or the software includes one or more modules or units corresponding to the foregoing function.

For example, the communication apparatus may include a transceiver unit and a processing unit.

The transceiver unit is configured to obtain an input signal.

The processing unit is configured to: map the input signal to N1 resource patches RPs, where the RP includes one or more resource elements REs, and each RP includes one signal vector determined based on the input signal; input N1 signal vectors to an input layer of a neural network for dimension increase processing, to obtain N2 high-dimensional signal vectors; input the N2 high-dimensional signal vectors to an interaction layer of the neural network, to obtain a feature between the N2 high-dimensional signal vectors and a feature of each high-dimensional signal vector; and input the feature between the N2 high-dimensional signal vectors and the feature of each high-dimensional signal vector to an output layer of the neural network for an operation, to obtain an output signal vector.

In an implementation, the interaction layer of the neural network includes at least one interaction module group, and each interaction module group includes a first interaction module and a second interaction module. The first interaction module is configured to obtain the feature between the N2 high-dimensional signal vectors, and the second interaction module is configured to obtain the feature of each high-dimensional signal vector. An interaction module group l includes a first interaction module l_1 and a second interaction module l_2, where $l \in L$. In the interaction module group l, input of the first interaction module l_1 is any one of the high-dimensional signal vector, output of a second interaction module l-1_2 in an interaction module group l-1, or output of a first interaction module l-1_1 in an interaction module group l-1, and input of the second interaction module l_2 is output of the first interaction module l_1. Alternatively, in the interaction module group l, input of the second interaction module l_2 is any one of the high-dimensional signal vector, output of a first interaction module l-1_1 in an interaction module group l-1, or output of a second interaction module l-1_2 in an interaction module group l-1, and input of the first interaction module l_1 is output of the second interaction module l_2.

In an implementation, the first interaction module includes an operation of an attention layer and the second interaction module includes an operation of a fully connected layer.

In an implementation, an operation performed by the attention layer on the N2 high-dimensional signal vectors satisfies the following formula:

$$ATT(Q, K, V) = softmax\left(\frac{QK^T}{\sqrt{d_k}}\right)V$$

$Q=SW^Q$, $K=SW^K$, $V=SW^V$, S is input of the attention layer, $W^Q$, $W^K$, and $W^V$ are obtained through training, $d_k$ is a dimension of the high-dimensional signal vector, $^T$ represents a matrix transpose operation, and ATT(Q, K, V) represents output of the attention layer. Q, K, and V represent results obtained by performing three linear transformations on input S, Q represents a query vector, $W^Q$ represents a query vector weight, K represents a keyword vector, $W^K$ represents a keyword vector weight, V represents a value vector, and $W^V$ represents a value vector weight.

In an implementation, an operation performed by the fully connected layer on the N2 high-dimensional signal vectors satisfies the following formula:

$$y = f(xW^M + b)$$

y is the feature of each high-dimensional signal vector, f is an activation function, $W^M$ and b are obtained through training, $W^M$ represents a weight of the fully connected layer, b represents an offset of the fully connected layer, and x is input of the fully connected layer.

In an implementation, an operation performed by the first interaction module is based on a first matrix, and the first matrix is an N2×N2 matrix. An operation performed by the second interaction module is based on a second matrix, the second matrix is a $d_k \times d_k$ matrix, and $d_k$ is a dimension of the high-dimensional signal vector.

In an implementation, elements on a main diagonal of the first matrix are the same. Elements of the first matrix other than the elements on the main diagonal are the same. Alternatively, the first matrix is obtained through calculation based on the input N2 high-dimensional signal vectors.

In an implementation, the interaction layer of the neural network includes a graph neural network, and the processing unit is configured to set each of the N2 high-dimensional signal vectors to a state of a node in the graph neural network at a $0^{th}$ time, where each node corresponds to one high-dimensional signal vector. The feature between the N2 high-dimensional signal vectors is an aggregated state of an adjacent node of each node in the graph neural network obtained at a $Z^{th}$ time, and a state of each high-dimensional signal vector is a state of each node at the $Z^{th}$ time, and the state of each node at the $Z^{th}$ time is obtained based on the aggregated state obtained at the $Z^{th}$ time and a state of each node at a $(Z-1)^{th}$ time, where Z is an integer greater than or equal to 1.

In an implementation, a quantity of REs included in each RP is determined based on a computing resource available to the communication apparatus and/or a physical resource occupied by the input signal.

In an implementation, an operation performed by the interaction layer is further based on a task vector, and the task vector is for obtaining high-dimensional task information. The output signal vector further includes target task information, and the target task information is obtained based on the high-dimensional task information.

In an implementation, the operation performed by the interaction layer is further based on a trainable vector, and the trainable vector is for obtaining global information of the N2 high-dimensional signal vectors.

The output signal vector is determined based on the feature between the N2 high-dimensional signal vectors, the feature of each high-dimensional signal vector, and the global information.

In an implementation, the input signal includes data received by the communication apparatus, and the output signal vector includes a log-likelihood ratio of the data.

In an implementation, the input signal includes a modulation symbol, and the output signal vector includes a transmission symbol.

In an implementation, the input signal includes a to-be-encoded bit, and the output signal vector includes an encoded bit or a transmission symbol.

According to a third aspect, this application provides a communication apparatus, including a processor. The processor is coupled to a memory, the memory is configured to store a computer program or instructions, and the processor is configured to execute the computer program or the instructions, to perform the method according to the implementations of the first aspect. The memory may be located inside or outside the apparatus. There are one or more processors.

According to a fourth aspect, this application provides a communication apparatus, including a processor and an interface circuit. The interface circuit is configured to communicate with another apparatus, and the processor is configured to perform the method according to the implementations of the first aspect.

According to a fifth aspect, a communication apparatus is provided. The apparatus includes a logic circuit and an input/output interface.

According to a sixth aspect, this application provides a communication system, including a communication apparatus that is configured to perform the method according to the implementations of the first aspect and another communication apparatus.

According to a seventh aspect, this application further provides a chip system, including a processor, configured to perform the method according to the implementations of the first aspect.

According to an eighth aspect, this application further provides a computer program product, including computer-executable instructions. When the computer-executable instructions are run on a computer, the method according to the implementations of the first aspect are performed.

According to a ninth aspect, this application further provides a computer-readable storage medium. The computer-readable storage medium stores a computer program or instructions. When the instructions are run on a computer, the method according to the implementations of the first aspect are implemented.

For technical effects achieved in the second aspect to the ninth aspect, refer to the technical effects in the first aspect. Details are not described herein again.

BRIEF DESCRIPTION OF DRAWINGS

FIG. 5A is a diagram of an interaction layer of a neural network according to an embodiment of this application;

FIG. 5B is a diagram of an interaction layer of a neural network according to an embodiment of this application;

FIG. 5C is a diagram of an interaction layer of a neural network according to an embodiment of this application;

DESCRIPTION OF EMBODIMENTS

In embodiments of this application, "a plurality of" refers to two or more. The term "and/or" describes an association relationship between associated objects and represents that three relationships may exist. For example, A and/or B may represent the following three cases: Only A exists, both A and B exist, and only B exists. The character "/" usually represents an "or" relationship between the associated objects. In addition, it should be understood that although terms such as "first" and "second" may be used in embodiments of this application to describe objects, these objects should not be limited by these terms. These terms are merely used to distinguish the objects from each other.

Terms "including", "having", and any other variant thereof mentioned in descriptions of embodiments of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of this application, the word "example" or "for example" represents giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In embodiments of this application, a symbol with a subscript is an expression form of the corresponding symbol. For example, $S_1$, $S_2$, $S_3$, and $S_4$ that have subscripts are expression forms of S, and $M_1$, $M_2$, . . . , and $M_N$ may be expression forms of M.

With reference to the accompanying drawings, the following describes a signal processing method according to embodiments of this application.

Figure 1:
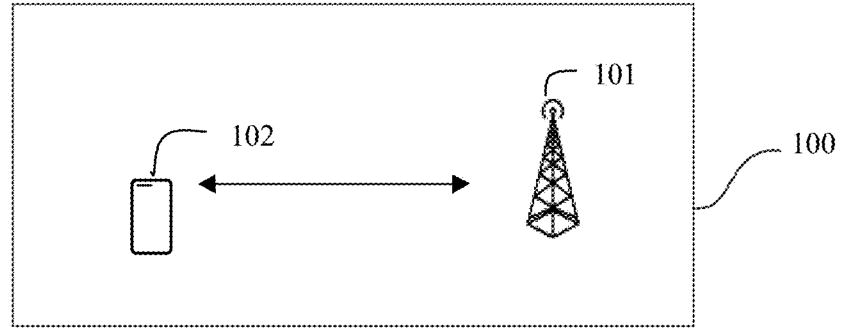
FIG. 1 is a diagram of a communication system according to an embodiment of this application.

With reference to FIG. 1, the following describes a communication system to which the signal processing method is applicable according to embodiments of this application. Refer to FIG. 1. The communication system 100 includes a network device 101 and a terminal device 102.

The terminal device in this application includes a device that provides a voice and/or data connectivity for a user. The terminal device includes a device that provides a voice for the user, includes a device that provides data connectivity for the user, or includes a device that provides a voice and data connectivity for the user. For example, the terminal device may include a handheld device with a wireless connection function or a processing device connected to a wireless modem. The terminal device may be user equipment (UE), a wireless terminal device, a mobile terminal device, a device-to-device (D2D) communication terminal device, a vehicle-to-everything (V2X) terminal device, a machine-to-machine/machine-type communication (M2M/MTC) terminal device, an internet of things (IoT) terminal device, a subscriber unit, a subscriber station, a mobile station, a remote station, an access point (AP), a remote terminal device, an access terminal device, a user terminal device, a user agent, a user device, a satellite, an uncrewed aerial vehicle, a balloon, an airplane, or the like. For example, the terminal device may include a mobile phone (or referred to as a "cellular" phone), a computer having a mobile terminal device, or a portable, pocket-sized, handheld, or computer-embedded mobile apparatus. For example, the terminal device may be a device such as a personal communication service (PCS) phone, a cordless telephone, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner. By way of example, and not limitation, in embodiments of this application, the terminal device may alternatively be a wearable device. The wearable device may also be referred to as a wearable intelligent device, an intelligent wearable device, or the like, and is a general term for wearable devices that are intelligently designed and developed for daily wear by using a wearable technology. If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

The network device in this application includes, for example, an access network (AN) device, for example, a base station or an access point, and may be a device that communicates with a wireless terminal device over an air interface in an access network by using one or more cells, or a transmission reception point (TRP) or a transmitting point (TP), a mobile switching center, a device that undertakes a base station function in device-to-device (D2D), vehicle-to-everything (V2X), and machine-to-machine (M2M) communication, and the like. Alternatively, the network device may be a road side unit (RSU) in a vehicle-to-everything (V2X) technology. The network device may include an evolved NodeB (NodeB or eNB or e-NodeB, evolved NodeB) in a long term evolution (LTE) or long term evolution-advanced (LTE-A) system, or may include a next generation NodeB (gNB) in an evolved packet core (EPC)

network, a 5th generation (5G) mobile communication technology, a new radio (NR) system, or may include a central unit (CU) and a distributed unit (DU) in a cloud radio access network (Cloud RAN) system, a satellite, an uncrewed aerial vehicle, a balloon, an aircraft, or the like. This is not limited in embodiments of this application.

In embodiments of this application, an apparatus configured to implement a function of the terminal device may be a terminal device, or may be an apparatus that can support the terminal device in implementing the function, for example, a chip system. The apparatus may be mounted in the terminal device or used in a manner of matching the terminal device. In embodiments of this application, the chip system may include a chip, or may include a chip and another discrete component.

In embodiments of this application, an apparatus configured to implement a function of the network device may be a network device, or may be an apparatus that can support the network device in implementing the function, for example, a chip system. The apparatus may be mounted in the network device or used in a manner of matching the network device.

In embodiments of this application, the terminal device may further have an AI processing capability, and the network device may also have an AI processing capability. For example, the terminal device may have a training capability, an inference capability, and the like of a neural network. Optionally, the network device may also have a training capability, an inference capability, and the like of a neural network.

Artificial intelligence technologies have been successfully applied in fields of image processing and natural language processing, and increasingly mature artificial intelligence technologies will play an important role in promoting evolution of mobile communication network technologies. Currently, the artificial intelligence technologies are mainly applied to a network layer, a physical layer, and the like.

For the artificial intelligence technology at the physical layer, modules at the physical layer, for example, modules for signal processing, are mostly replaced by using the artificial intelligence technology. Main advantages of the artificial intelligence technology are reducing an operation delay, improving algorithm performance, and the like. However, for the modules at the physical layer, performance achieved by an independent optimization algorithm of each module is close to an upper bound of the performance. Therefore, a limited gain can be obtained through only module replacement. Therefore, performing joint optimization on a plurality of modules is a manner of improving joint performance of the plurality of modules, and is also done well by using the artificial intelligence technologies, for example, jointly designing a receiver by using the artificial intelligence technologies.

Figure 2:
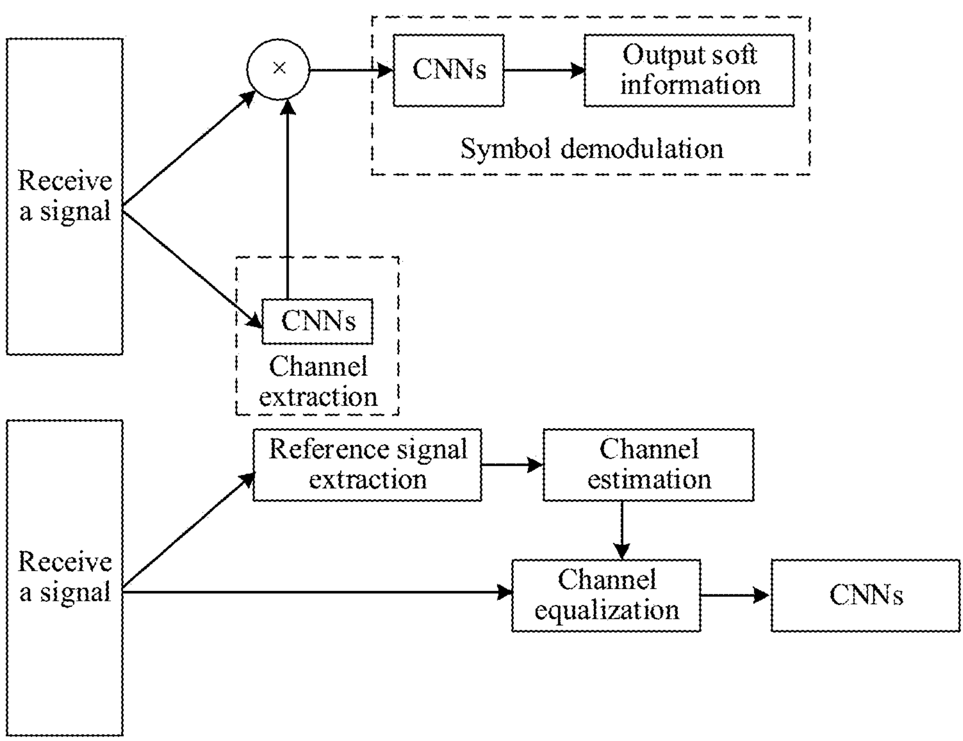
FIG. 2 is a diagram of a signal processing method of a receiver based on a convolutional neural network structure.

In an implementation, the receiver may be designed in a structure of a convolutional neural network (CNN), as shown in FIG. 2. CNNs in FIG. 2 may represent a plurality of layers of convolutional neural networks. It can be learned that the convolutional neural network structure is still used for designing a current receiver structure, and is mainly used for channel estimation, equalization, demodulation, and the like. However, because a range of correlations that can be extracted by the CNN is limited, and usually only a part can be extracted, for example, a correlation between adjacent signal patches, the main disadvantages of designing the receiver in the structure of the CNN are that a quantity of parameters of the CNN is small, and generalization performance of a convolution operation principle is poor in different scenarios. For example, it is difficult for a complex frequency selective channel to have good performance even if the convolutional neural network is used for designing the receiver in a multiple-input multiple-output (MIMO) scenario.

Figures 3, 4:
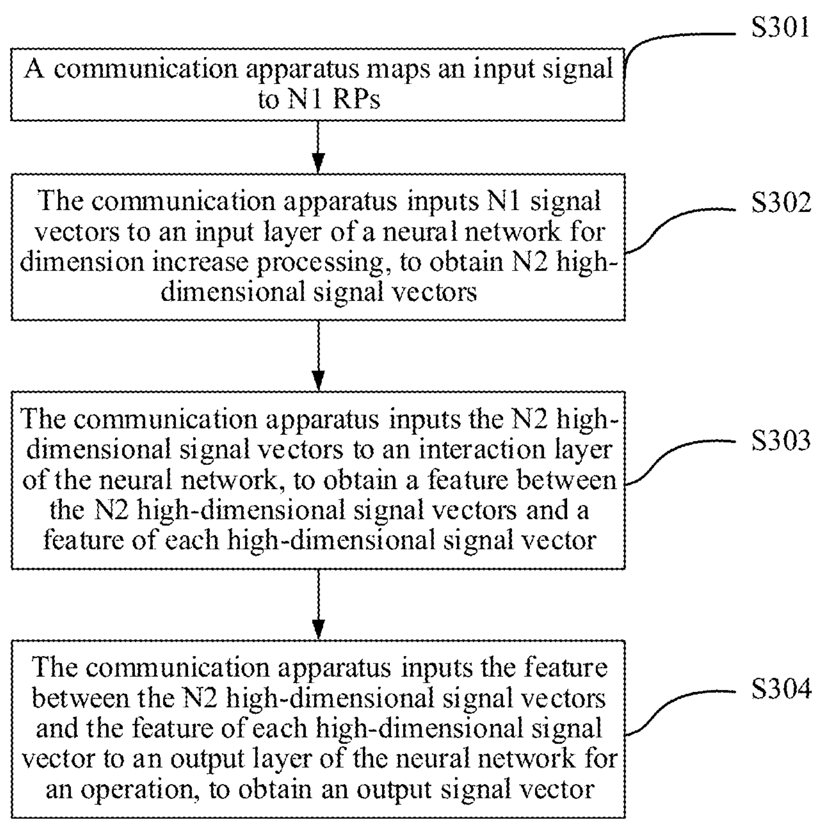
FIG. 3 is an example flowchart of a signal processing method according to an embodiment of this application.
FIG. 4 is a diagram of a neural network according to an embodiment of this application.

In view of this, an embodiment of this application provides a signal processing method. The method may be applied to a communication apparatus, for example, a terminal device or a network device. The method is applicable to a receiving end, or may be applicable only to a transmitting end. FIG. 3 is an example flowchart of a signal processing method according to an embodiment of this application. The method may include the following operations.

S301: Map an input signal to N1 resource patches (RPs), where N1 is a positive integer.

Each RP includes one signal vector determined based on the input signal. The RP is a resource granularity, and may be a subset of a scheduled physical resource. For example, one resource patch may include one or more REs.

It may be understood that the input signal in S301 may be a received signal, for example, may be a signal received from a network device. Alternatively, the input signal in S301 may be a signal obtained from a higher layer of a communication apparatus, for example, a physical layer. For example, when the method is applied to a transmitting end, the input signal may be a communication signal vector such as a bit or a symbol. For example, when the method is applied to a receiving end, the input signal may be a symbol received at the receiving end; or the input signal may be a communication signal vector representing a probability, such as a log-likelihood ratio of a symbol.

S302: Input N1 signal vectors to an input layer of a neural network for dimension increase processing, to obtain N2 high-dimensional signal vectors, where N2 is a positive integer. It may be understood that N2 and N1 herein may be the same or different, and N2 may be greater than N1 or may be less than N1.

In S302, the input layer of the neural network may perform dimension increase processing on the signal vector to obtain the high-dimensional signal vector. For example, the input layer of the neural network may change a 16-dimensional signal vector to a 256-dimensional signal vector. For ease of description below, a dimension of the high-dimensional signal vector is described as $d_k$, where $d_k$ is a positive integer.

S303: Input the N2 high-dimensional signal vectors to an interaction layer of the neural network, to obtain a feature between the N2 high-dimensional signal vectors and a feature of each high-dimensional signal vector.

In an implementation, the interaction layer of the neural network may be used for obtaining the feature of the high-dimensional signal vector. For example, the interaction layer of the neural network may be used for obtaining the feature of each high-dimensional signal vector, or may obtain the feature between the high-dimensional signal vectors. The feature between the high-dimensional signal vectors includes a feature between every two high-dimensional vectors. For example, four high-dimensional signal vectors are obtained in S302: S1, S2, S3, and S4. In S303, the interaction layer of the neural network may obtain a feature of S1, a feature of S2, a feature of S3, and a feature of S4; and a feature from S1 to S2, a feature from S1 to S3, a feature from S1 to S4, a feature from S2 to S1, a feature from S2 to S3, a feature from S2 to S4, and so on. Therefore, the features between the four high-dimensional vectors may be obtained.

S304: Input the feature between the N2 high-dimensional signal vectors and the feature of each high-dimensional signal vector to an output layer of the neural network for an operation, to obtain an output signal vector.

In S304, the output layer of the neural network may perform the operation based on the feature between the N2 high-dimensional signal vectors and the feature of each high-dimensional signal vector, to obtain the output signal vector. It may be understood that an operation of the output layer of the neural network varies with a scenario. For example, in a channel decoding scenario, the operation of the output layer of the neural network may be obtaining a log-likelihood ratio based on the feature between the N2 high-dimensional signal vectors and the feature of each high-dimensional signal vector. That is, the output signal vector is the log-likelihood ratio. For another example, in a channel coding scenario, the output layer of the neural network may obtain an encoded code block based on the feature between the N2 high-dimensional signal vectors and the feature of each high-dimensional signal vector. That is, the output signal vector is the encoded code block. For still another example, when the input signal in S301 is a log-likelihood ratio of a symbol, the corresponding output signal vector may be in a bit form.

Optionally, in S304, the output layer of the neural network may further perform dimension reduction on the feature between the N2 high-dimensional signal vectors and the feature of each high-dimensional signal vector, and obtain an output signal vector based on a feature between the N2 high-dimensional signal vectors and a feature of each high-dimensional signal vector that are obtained through the dimension reduction.

For ease of description below, N1 and N2 are set to N.

Refer to FIG. 4. A structure of a neural network according to an embodiment of this application is described. FIG. 4 is an example diagram of a structure of a neural network according to an embodiment of this application. It may be understood that FIG. 4 is merely used as an example of the structure of the neural network, and cannot constitute a limitation on the structure of the neural network. A person skilled in the art may design, based on the neural network shown in FIG. 4, another neural network used for signal processing, to implement the operations shown in FIG. 3.

As shown in FIG. 4, input of an input layer is N signal vectors x formed through resource patch mapping, which are respectively $x_1$ to $x_N$. The input layer performs dimension increase processing on the N signal vectors to obtain N high-dimensional signal vectors S: $S_1$ to $S_N$. A dimension of each high-dimensional signal vector is $d_k$. In other words, a dimension of output of the input layer is dimensions $N \times d_k$. Input of an interaction layer is the output of the input layer, and the interaction layer may obtain a feature of each high-dimensional signal vector in $S_1$ to $S_N$. It may be understood that obtaining the feature of each high-dimensional signal vector may be considered as an operation performed by the interaction layer on a dimension $d_k$ in the dimensions $N \times d_k$. The interaction layer may further obtain a feature between high-dimensional signal vectors in $S_1$ to $S_N$. It may be understood that obtaining the feature between the high-dimensional signal vectors in $S_1$ to $S_N$ may be considered as an operation performed by the interaction layer on a dimension N in the dimensions $N \times d_k$. Therefore, output of the interaction layer is also $(N \times d_k)$-dimensional. The feature of each high-dimensional signal vector and features $h_1$ to $h_N$ between the N high-dimensional signal vectors may be obtained via the interaction layer. Input of an output layer is the output of the interaction layer, and the output layer may output signal vectors $o_1$ to $o_N$ based on $h_1$ to $h_N$.

It should be noted that a dimension of the input of the interaction layer is the same as the dimension of the output of the interaction layer. Therefore, a quantity of signal vectors input to the interaction layer is the same as a quantity of signal vectors output by the interaction layer. The input layer may increase or decrease a quantity of input signal vectors. Similarly, the output layer may also increase or decrease the feature of each input high-dimensional signal vector and the feature between the N high-dimensional signal vectors.

According to the foregoing solution, the feature of each signal vector and the feature between the signal vectors are obtained via the interaction layer. Because the feature of the signal vector and the feature between the signal vectors are independent of a dimension of the signal vector, complexity of signal processing can be reduced. In addition, a quantity of signal vectors input to the interaction layer may be changed, so that scalability of signals in different dimensions can be implemented.

In an implementation, the interaction layer may include at least one interaction module group. An interaction module group l may include a first interaction module l_1 and a second interaction module l_2. The first interaction module l_1 may be configured to obtain the feature between the N2 high-dimensional signal vectors, and the second interaction module l_2 may be configured to obtain the feature of each high-dimensional signal vector. It may be understood that a sequence of the first interaction module and the second interaction module in each interaction module group is not limited. Because the dimension of the input of the interaction layer is the same as the dimension of the output of the interaction layer, L layers of iterations may be performed at the interaction layer. In other words, L interaction module groups may be connected to each other, so that the L layers of iterations are performed at the interaction layer. l is an integer greater than or equal to 1 and less than L.

Refer to FIG. 5A. In an interaction module group 1, a first interaction module 1_1 is before a second interaction module 1_2. In other words, output of the first interaction module 1_1 is used as input of the second interaction module 1_2. In an interaction module group 2, a first interaction module 2_1 is after a second interaction module 2_2. In other words, output of the second interaction module 2_2 is used as input of the first interaction module 2_1. It can be learned from FIG. 5A that input of a first interaction module l_1 may be a high-dimensional signal vector, or may be output of a second interaction module l_2. Input of the second interaction module l_2 may be output of the first interaction module l_1, or may be output of a second interaction module l-1_2.

Refer to FIG. 5B. In an interaction module group 1, a first interaction module 1_1 is before a second interaction module 1_2. In other words, output of the first interaction module 1_1 is used as input of the second interaction module 1_2. In an interaction module group 2, a first interaction module 2_1 is before a second interaction module 2_2. In other words, output of the first interaction module 2_1 is used as input of the second interaction module 2_2. It can be learned from FIG. 5B that input of a first interaction module l_1 may be a high-dimensional signal vector, or may be output of a second interaction module l-1_2. Input of a second interaction module l_2 may be output of the first interaction module l_1.

Refer to FIG. 5C. In an interaction module group 1, a first interaction module 1_1 is after a second interaction module 1_2. In other words, output of the second interaction module 1_2 is used as input of the first interaction module 1_1. In an interaction module group 2, a first interaction module 2_1 is before a second interaction module 2_2. In other words, output of the first interaction module 2_1 is used as input of the second interaction module 2_2. It can be learned from FIG. 5C that input of a first interaction module 1_1 may be output of a second interaction module 1_2, or may be output of a first interaction module l-1_1. Input of the second interaction module 1_2 may be a high-dimensional signal vector, or may be output of the first interaction module 1_1.

Figure 5D:
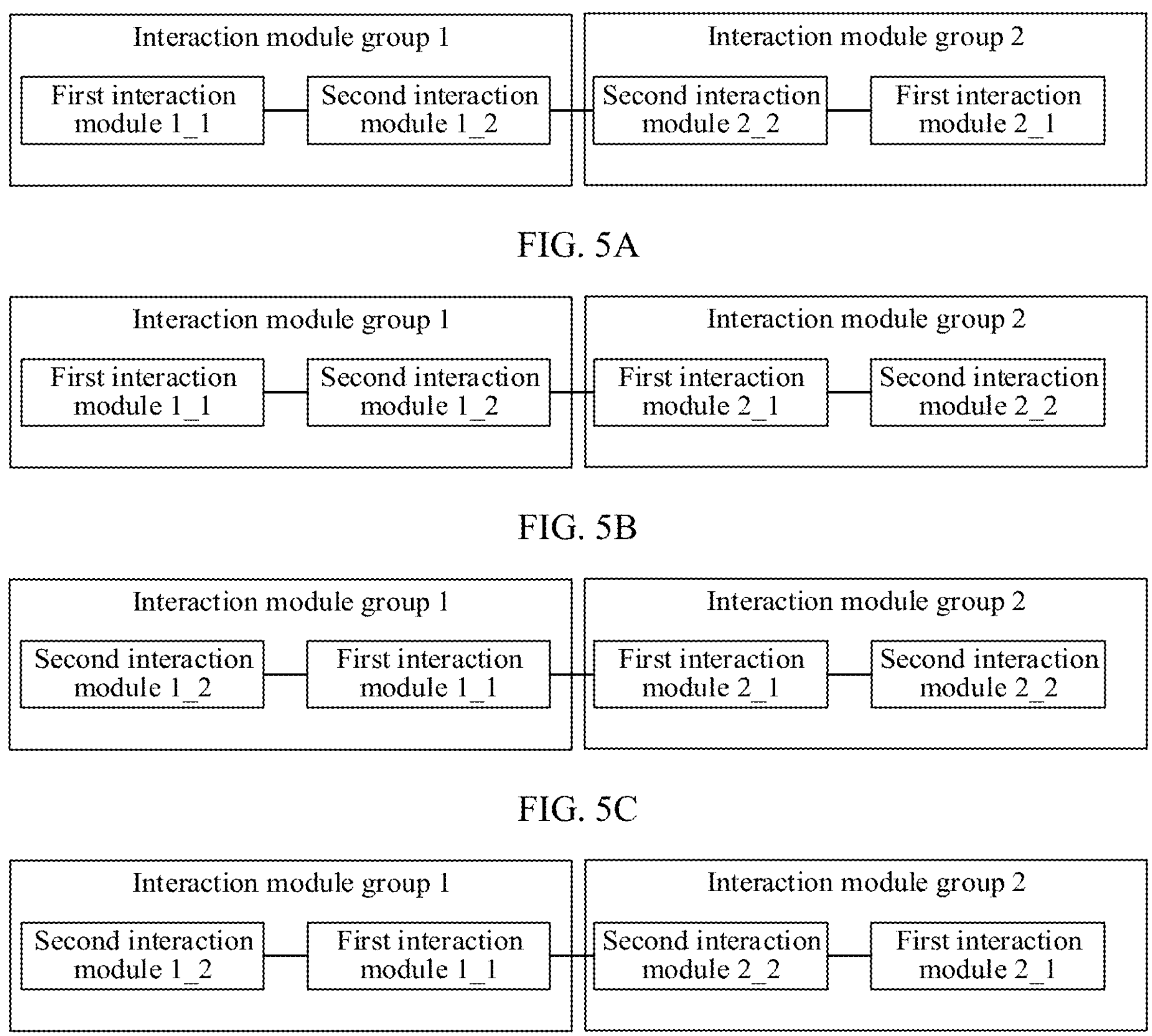
FIG. 5D is a diagram of an interaction layer of a neural network according to an embodiment of this application.

Refer to FIG. 5D. In an interaction module group 1, a first interaction module 1_1 is after a second interaction module 1_2. In other words, output of the second interaction module 1_2 is used as input of the first interaction module 1_1. In an interaction module group 2, a first interaction module 2_1 is after a second interaction module 2_2. In other words, output of the second interaction module 2_2 is used as input of the first interaction module 2_1. It can be learned from FIG. 5D that input of a first interaction module 1_1 may be output of a second interaction module 1_2. Input of the second interaction module may be a high-dimensional signal vector, or may be output of a first interaction module l-1_1.

In an implementation, when a quantity of dimensions of a high-dimensional signal vector is greater than 2, for example, when dimensions of high-dimensional signal vectors are $N \times d_k \times y$, the interaction layer may further include a third interaction module. The third interaction module may be configured to obtain a feature of the high-dimensional signal vector in a dimension y and a correlation, or the third interaction module may be configured to perform dimension transformation on the high-dimensional signal vector, for example, change the high-dimensional signal vector from a three-dimensional vector into a two-dimensional vector. It may be understood that a sequence relationship among the third interaction module, the first interaction module, and the second interaction module may not be limited. For details, refer to the foregoing implementation of the sequence relationship between the first interaction module and the second interaction module.

According to the foregoing solution, a plurality of layers of iterations at the interaction layer are implemented via a plurality of interaction module groups, so that a performance gain of the neural network can be obtained.

The interaction layer mentioned in embodiments of this application is further described below in Manner 1 to Manner 3.

Manner 1:

The first interaction module may include an operation of an attention layer, and the second interaction module may include an operation of a fully connected layer. In other words, the operation of the interaction layer may include the operation of the attention layer and the operation of the fully connected layer. The operation of the attention layer may satisfy the following formula (1):

$$ATT(Q, K, V) = softmax\left(\frac{QK^T}{\sqrt{d_k}}\right)V \quad \text{Formula (1)}$$

$$Q_{N\times d_k} = S_{N\times d_k} W^Q_{d_k\times d_k},\ K_{N\times d_k} = S_{N\times d_k} W^K_{d_k\times d_k},$$

-continued $$V_{N\times d_k} = S_{N\times d_k} W^V_{d_k\times d_k}, \text{ and } W^Q, W^K,$$

and $W^V$ are trained parameters. $S_{N\times d_k}$ is input of the attention layer, where N may be understood as a quantity of high-dimensional signal vectors S, and $d_k$ is a dimension of each high-dimensional signal vector S. ATT(Q, K, V) is output of the attention layer and represents a correlation between any two high-dimensional signal vectors. Q, K, and V represent results obtained by performing three linear transformations on input S, Q represents a query vector, $W^Q$ represents a query vector weight, K represents a keyword vector, $W^K$ represents a keyword vector weight, V represents a value vector, and $W^V$ represents a value vector weight. It can be learned that the input of the attention layer is $(N\times d_k)$-dimensional.

Optionally, if the attention layer is expanded to a multi-head attention layer, $W^Q$, $W^K$, and $W^V$ each have a plurality of groups of values. It may be understood that parameters of attention layers of each interaction module group may be different.

It should be noted that $W^Q$, $W^K$, and $W^V$ may be trained in a gradient backpropagation manner. For example, initial parameters of $W^Q$, $W^K$, and $W^V$ may be set to random numbers, and high-dimensional signal vectors used during training are processed via the attention layer, to obtain output signal vectors used during the training. A training gradient is obtained by using a known output signal vector and the output signal vector used during the training, and the gradient is back propagated to the attention layer, so that $W^Q$, $W^K$, and $W^V$ are adjusted. In the foregoing training manner, $W^Q$, $W^K$, and $W^V$ may be trained for a plurality of times, to obtain trained $W^Q$, $W^K$, and $W^V$.

The fully connected layer performs an operation on each high-dimensional signal vector independently, and each high-dimensional signal vector shares a parameter of the fully connected layer. The operation of the fully connected layer may satisfy the following formula (2):

$$y = f(xW^M + b) \quad \text{Formula (2)}$$

y represents output of the fully connected layer, x represents input of the fully connected layer, and f is an activation function. For example, the activation function may be one of a linear function, a pseudo-inverse function, an inverse function, a Sigmoid function, a Softmax function, a Relu function, a Gelu function, and the like. $W^M$ represents a weight of the fully connected layer, and b represents an offset of the fully connected layer. $W^M$ and b are trained parameters. For training manners, refer to the foregoing implementation of the training manners of $W^Q$, $W^K$, and $W^V$. It may be understood that parameters of fully connected layers of each interaction module group may be different.

Figure 6:
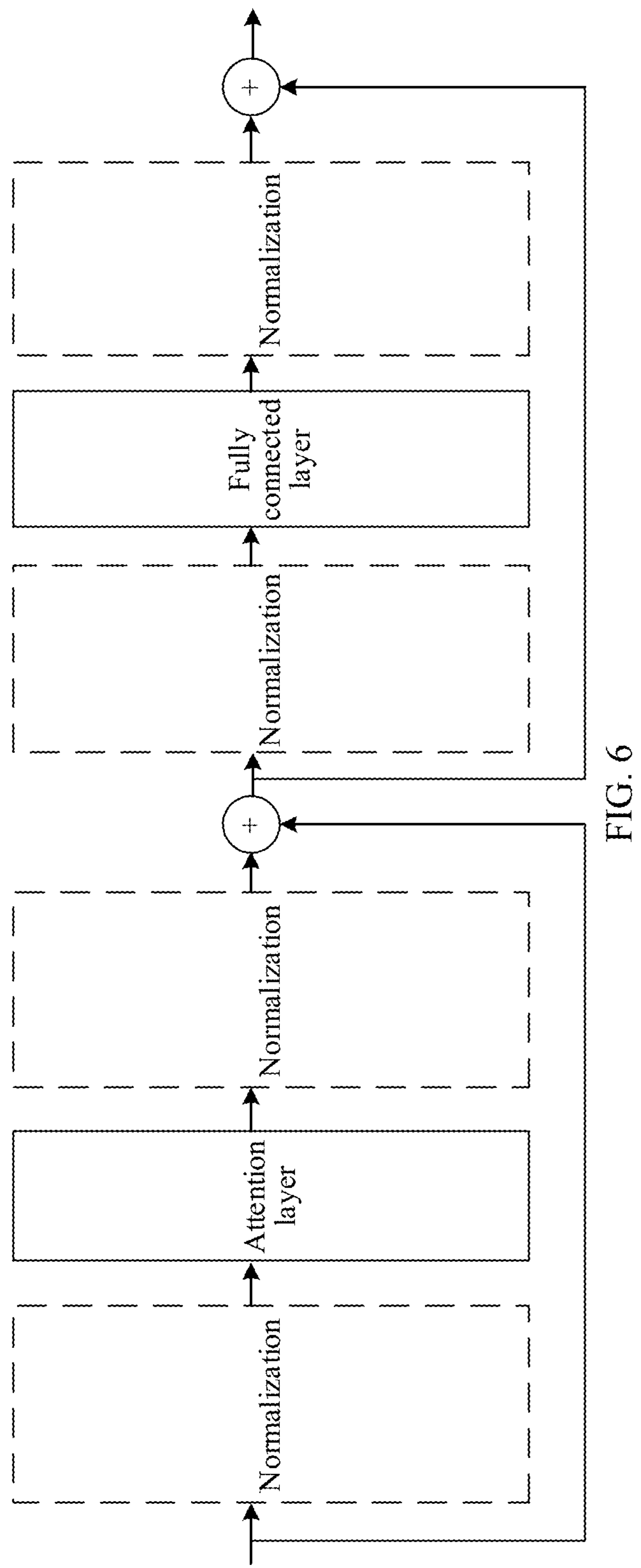
FIG. 6 is a diagram of an interaction layer of a neural network according to an embodiment of this application.

FIG. 6 shows an example of an interaction layer. As shown in FIG. 6, a dashed box labeled normalization may represent an optional position for normalization operation. It can be learned from FIG. 6 that the normalization operation may be set before an attention layer, after the attention layer, before a fully connected layer, and/or after the fully connected layer. It may be understood that an interaction layer may include one or more normalization operations. The normalization operation may normalize each feature dimension of a batch of data. In other words, the normalization operation may be batch normalization performed on the high-dimensional signal vector. Alternatively, the normalization operation may normalize all feature dimensions of a group of data. In other words, the normalization operation may be layer normalization performed on the high-dimensional signal vector. For example, the normalization operation may satisfy the following formula (3):

$$y = \frac{x - \mu}{\sqrt{\sigma + \in}} \times \gamma + \beta \quad \text{Formula (3)}$$

x represents input of the normalization operation, y represents output of the normalization operation, μ represents an average value calculated based on x, σ represents a variance calculated based on x, ∈ is a preset minimum value to prevent 0 from appearing in a denominator, and γ and β are trained parameters.

An example in which the normalization operation is before the attention layer and before the fully connected layer is used. Input of a first normalization operation may be N high-dimensional signal vectors. For the first normalization operation, refer to the foregoing formula (3). Output of the first normalization operation may be N normalized high-dimensional signal vectors. Input of the attention layer may be the output of the first normalization operation. For an operation of the attention layer, refer to the foregoing formula (1). The attention layer may obtain a feature between the N high-dimensional signal vectors. Output of the attention layer may be the feature between the N high-dimensional signal vectors. It can be learned from FIG. 6 that input of a second normalization operation may be the output of the attention layer and the N high-dimensional signal vectors. Adding the N high-dimensional signal vectors to the input of the second normalization operation can speed up convergence and solve a problem of gradient dispersion. The second normalization operation may normalize the N high-dimensional signal vectors and features of the N high-dimensional signal vectors, and output of the second normalization operation may be normalized a feature between the N high-dimensional signal vectors and the N high-dimensional signal vectors. A dimension of the output of the normalization operation is the same as a dimension of output of the fully connected layer. Input of the fully connected layer may be output of the second normalization operation. For an operation of the fully connected layer, refer to the foregoing formula (2). The fully connected layer may obtain the features of the N high-dimensional signal vectors. The output of the fully connected layer may be the feature between the N high-dimensional signal vectors and the features of the N high-dimensional signal vectors.

It should be noted that, in a second interaction module group, input of a third normalization operation may be the N high-dimensional signal vectors, the feature between the N high-dimensional signal vectors, and the features of the N high-dimensional signal vectors. By analogy, the interaction layer shown in FIG. 6 may be iterated for L times.

In another case, an iterative operation may be stopped based on an actual situation. For example, a convergence condition may be set, for example, a convergence in which an average output error between an $l^{th}$ iteration and an $(l+1)^{th}$ iteration is less than a threshold, where l is an integer greater than or equal to 1 and less than L.

In an example, input and output of each operation at the interaction layer may be considered as a matrix, and the matrix may be $(N \times d_k)$-dimensional. In this case, input of a second normalization layer may be a matrix obtained by adding the output of the attention layer and the N high-dimensional signal vectors. That is, the input of the second normalization operation is still a $(N \times d_k)$-dimensional matrix.

It should be noted that, in this embodiment of this application, each operation of the neural network, for example, an input layer, a first interaction module and a second interaction module in the interaction layer, and an output layer, may be set as an operation of a fully connected neural network. An operation of the first interaction module in the interaction layer may be applying a self-focusing mechanism to output of a plurality of fully connected neural networks.

The interaction layer is set based on Manner 1, so that independent transformation of the input signal vector is implemented. In other words, a neural network parameter is independent of the dimension of the input signal vector. As a result, scalability of the neural network is implemented. In addition, a correlation between any two signal vectors may be extracted via the attention layer, and a larger quantity of parameters can be obtained, so that the neural network can be applied to more communication scenarios.

Manner 2:

An operation performed by the first interaction module may be based on a first matrix, and an operation performed by the second interaction module may be based on a second matrix. In other words, the operation of the interaction layer may include an operation based on the first matrix and an operation based on the second matrix.

Figures 7A, 7B, 7C:
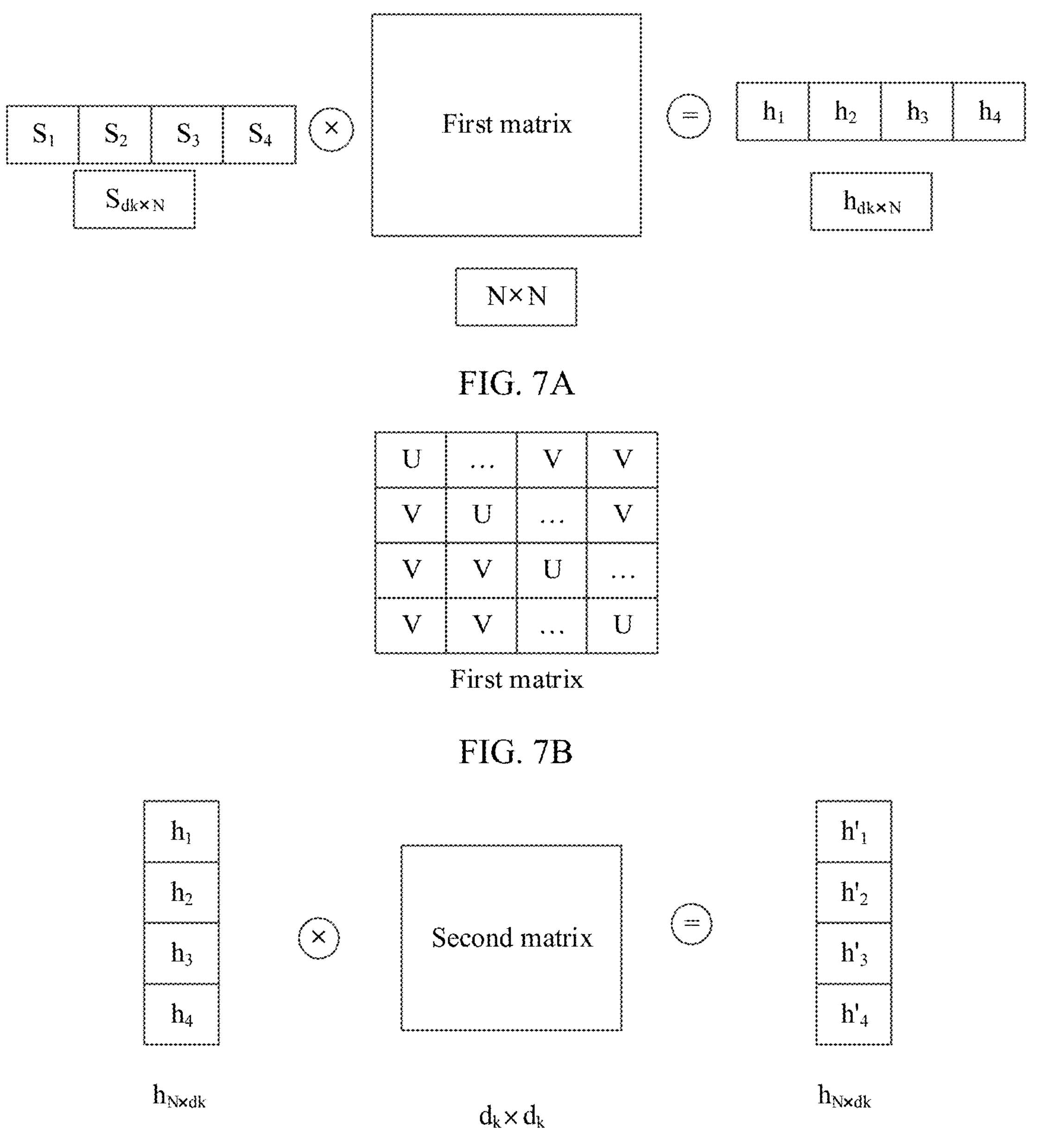
FIG. 7A is a diagram of a first interaction module of a neural network according to an embodiment of this application.
FIG. 7B is a diagram of a first matrix according to an embodiment of this application.
FIG. 7C is a diagram of a second interaction module according to an embodiment of this application.

Refer to FIG. 7A. The first matrix may be an N×N matrix.

In a case, the first matrix may be a trained matrix. For training manners of the first matrix, refer to the foregoing training manners of $W^Q$, $W^K$, and $W^V$. As shown in FIG. 7B, elements on a main diagonal of the first matrix are the same and are U, and elements that are not on the main diagonal are the same and are V. The element U on the main diagonal represents obtaining a feature of a signal vector, and the element V other than the element on the main diagonal represents obtaining features of a signal vector and another signal vector. For example, when a dimension of an input high-dimensional signal vector is $3 \times d_k$, the first matrix is a 3×3 matrix. In the first matrix, an element in the first row and the first column is U, and the element is for obtaining a feature of a first high-dimensional signal vector; an element in the first row and the second column is V, and the element is for obtaining features of the first high-dimensional signal vector and a second high-dimensional signal vector; and an element in the first row and the third column is V, the element is for obtaining features of the first high-dimensional signal vector and a third high-dimensional signal vector, and so on. Because the first matrix is the N×N matrix, the first matrix is expanded as a quantity of input high-dimensional signal vectors increases, the first matrix has scalability.

As shown in FIG. 7A, it is assumed that first output of the first interaction module is, in other words, the first row of a matrix output by the first interaction module is $h_1=f(S_1U, S_2V, S_3V, S_4V \ldots)$, where f may be summation, and represents that S is multiplied by the first matrix. It may be understood that f may alternatively be calculating a maximum value, a minimum value, an average value, or the like. This is not limited in this application. S may represent an input high-dimensional signal vector.

In another case, the first matrix is calculated based on N input high-dimensional signal vectors. The first matrix may be $f(R_S)$, $f(C_S)$, $f(\cos_S)$, or the like, $R_S$ represents an autocorrelation matrix of S, $C_S$ represents an autocovariance matrix of S, $\cos_S$ represents calculating a cosine similarity between every two of high-dimensional signal vectors S, and f represents a normalization or non-linear operation. S may represent an input high-dimensional signal vector.

In still another case, the first matrix may be in a form of a fully connected neural network. For example, output of the first interaction module is $h_S=f(SW^S+b)$. $W^S$ and b are trained parameters. For training manners, refer to the foregoing training manners of $W^Q$, $W^K$, and $W^V$. f is an activation function. $W^S$ may be a weight, and b may be an offset.

In this embodiment of this application, b represents the offset of the fully connected neural network. Values of b in different modules may be different, and b is determined based on an actual training result. For example, a value of b in $h_S$ may be different from a value of b in the foregoing formula (2).

Refer to FIG. 7C. The second matrix may be a $d_k \times d_k$ matrix. The second matrix may be a trained parameter. For training manners, refer to the foregoing training manners of $W^Q$, $W^K$, and $W^V$. It is assumed that first output of the second interaction module is $h'_1=f(h_1W)$, where f may be summation, and represents that $h_1$ is multiplied by the first matrix, $h_1$ represents first output of the first interaction module, and W represents a weight. It may be understood that f may alternatively be calculating a maximum value, a minimum value, an average value, or the like. This is not limited in this application.

It may be understood that the second matrix may also be expanded to a form of a fully connected neural network, for example, $h'=f(hW+b)$, where W and b are trained parameters. For training manners, refer to the foregoing training manners of $W^Q$, $W^K$, and $W^V$. f is an activation function.

Optionally, a plurality of first matrices and a plurality of second matrices may also be concatenated in an iteration. The operation of the first interaction module may be an operation based on the plurality of first matrices, and the operation of the second interaction module may be an operation based on the plurality of second matrices.

Figure 8:
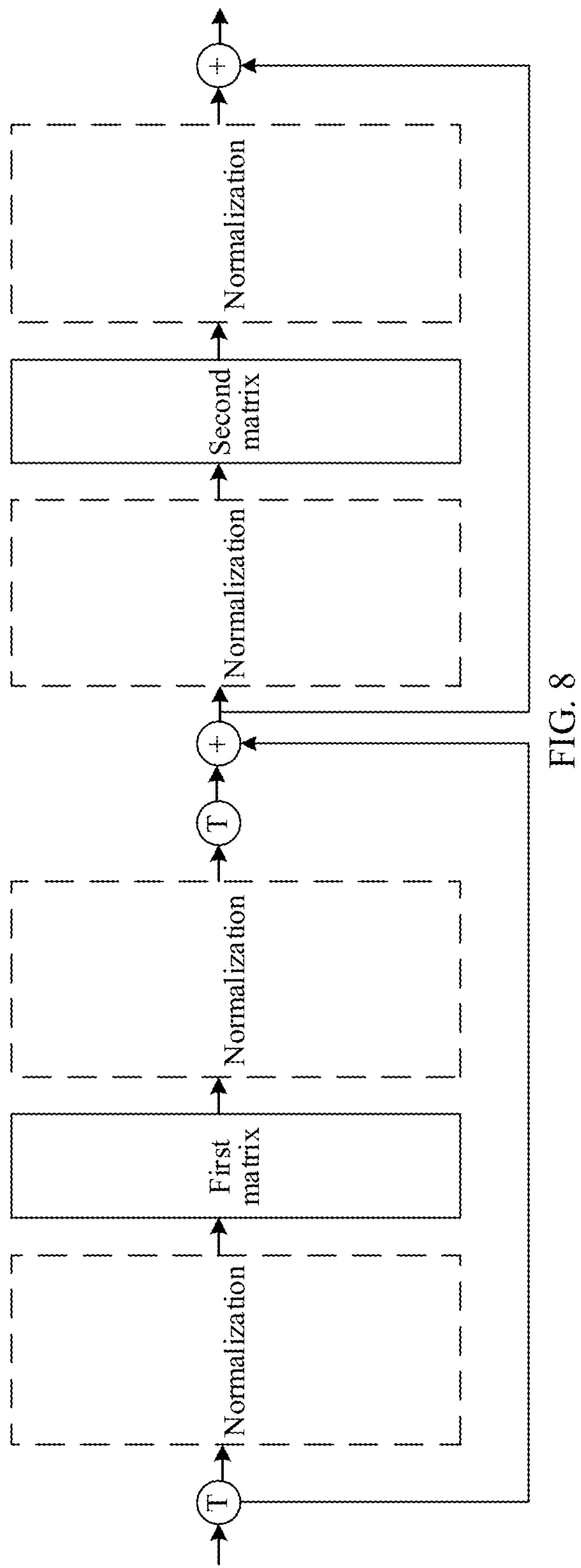
FIG. 8 is a diagram of an interaction layer of a neural network according to an embodiment of this application.

FIG. 8 shows an example of an interaction layer. As shown in FIG. 8, a dashed box labeled normalization may represent an optional position for normalization operation. For setting of the normalization operation, refer to the related descriptions in FIG. 6. Details are not described herein again. As shown in FIG. 8, before a first normalization operation, a matrix transpose operation may be performed on an input high-dimensional signal vector. This is because input of the interaction layer is $(N \times d_k)$-dimensional, and the first interaction module performs an operation on an N dimension. Therefore, the matrix transpose operation may be performed on the input high-dimensional signal vector. In other words, the $(N \times d_k)$-dimensional high-dimensional signal vector is transposed into $(d_k \times N)$-dimensional. Similarly, a matrix transpose operation may be added after output of the first interaction module. In other words, the matrix transpose operation may be performed on the output of the first interaction module. This is because the output of the first interaction module is $(d_k \times N)$-dimensional, and the second interaction module performs an operation on a $d_k$ dimension. Therefore, the matrix transpose operation may be performed on the output of the first interaction module. In other words, a feature between N $(d_k \times N)$-dimensional high-dimensional signal vectors is transposed into $(N \times d_k)$-dimensional.

The interaction layer is set based on Manner 2, so that independent transformation of the input signal vector is implemented. The feature between the signal vectors can be obtained by using the first matrix, and the feature of each signal vector can be obtained by using the second matrix. Therefore, scalability of the neural network is implemented by expanding the matrix. In addition, a correlation between any two signal vectors may be extracted by using the first matrix, and a larger quantity of parameters can be obtained, so that the neural network can be applied to more communication scenarios.

Manner 3

In Manner 3, the operation of the interaction layer may be an operation of a graph neural network. The following provides descriptions.

Input of the graph neural network may be a high-dimensional signal vector $$S_{N \times d_k} = \{S_1^0, S_2^0, \ldots, S_N^0\},$$

where 0 in $$S_N^0$$

may represent an initial state of the high-dimensional signal vector. A communication apparatus may use each high-dimensional signal vector as a node in the graph neural network. That is, the graph neural network may have N nodes. In other words, the communication apparatus may set each high-dimensional signal vector to an initial state of the node in the graph neural network, for example, a state of the $0^{th}$ iteration. One high-dimensional signal vector may correspond to one node. In the graph neural network, the first interaction module and the second interaction module are not explicitly distinguished in structure, and the first interaction module and the second interaction module are distinguished in operation steps of the graph neural network.

Figure 9:
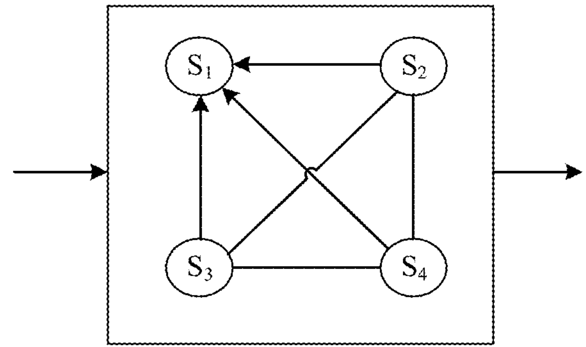
FIG. 9 is a diagram of an interaction layer of a neural network according to an embodiment of this application.

FIG. 9 shows an example of an interaction layer according to an embodiment of this application. In FIGS. 9, $S_1$, $S_2$, $S_3$, and $S_4$ may be nodes of the graph neural network. An operation of a first interaction module may be that $S_N$ obtains an aggregated state of other adjacent nodes. $S_N$ represents any node in the graph neural network. For example, $S_1$ may obtain an aggregated state of $S_2$, $S_3$, and $S_4$. The operation of the first interaction module may satisfy the following formula (4):

$$S_{\mathcal{N}(v)}^K = \text{AGGREGATE}_K\left(S_u^{K-1}, \forall\, u \in \mathcal{N}(v)\right) \qquad \text{Formula (4)}$$

An aggregate function (AGGREGATE) may be calculating a maximum value, a minimum value, an average value, a sum, or the like.

In the foregoing formula (4), Z represents a quantity of iterations, $\mathcal{N}(v)$ represents another node adjacent to a node v, $S_{\mathcal{N}(v)}^K$ represents an aggregated state of the another node that is connected to the node v and that is in a $Z^{th}$ iteration, and $$S_u^{K-1}$$

represents a state of a $(Z-1)^{th}$ iteration of the another node adjacent to the node v, where Z is an integer greater than or equal to 1. Z may be a preset quantity of iterations. It may be understood that a state of the node at a $0^{th}$ time may be a high-dimensional signal vector corresponding to the node.

An operation of a second interaction module may be that $S_N$ updates a state of $S_N$ based on the aggregated state of the another adjacent node at the $Z^{th}$ time and a state of $S_N$ at the $Z^{th}$ time. The operation of the second interaction module may satisfy the following formula (5):

$$S_v^K = \sigma\left(w^K \cdot concat\left(S_v^{K-1}, S_{\mathcal{N}(v)}^K\right)\right) \quad \text{Formula (5)}$$

σ is an activation function, Z represents a quantity of iterations, where Z is an integer greater than or equal to 1. Z may be a preset quantity of iterations. $w^K$ represents a weight of a $Z^{th}$ iteration, $$S_v^{K-1}$$

represents a state of the node v in a $(Z-1)^{th}$ iteration, $S_{\mathcal{N}(v)}^K$ represents an aggregated state of another node that is connected to the node v and that is in the $Z^{th}$ iteration, and a concatenate function (concat) may represent concatenation, that is, concatenates $S_{\mathcal{N}(v)}^K$ and $$S_v^{K-1}.$$

It may be understood that the concatenation may be understood as splicing two vectors into one vector.

Through K iterations, the graph neural network may output a state of each node at the $Z^{th}$ time and an aggregated state that is of an adjacent node and that is obtained by each node at the $Z^{th}$ time. It may be understood that a dimension of the state of each node that is output by each node at the $Z^{th}$ time and the aggregated state of the adjacent node that is obtained by each node at the $Z^{th}$ time is $d_k$, and a dimension of a state of each node that is output by N nodes at the $Z^{th}$ time and an aggregated state that is of an adjacent node that is obtained by each node at the $Z^{th}$ time is $N \times d_k$. The state of each node at the $Z^{th}$ time may be understood as a feature of each high-dimensional signal vector. The aggregated state that is of the adjacent node and that is obtained by each node at the $Z^{th}$ time may be understood as a feature between high-dimensional signal vectors.

The interaction layer is set based on Manner 3. The feature between the high-dimensional signal vectors and the feature of each high-dimensional signal vector may be obtained via the graph neural network, and the obtained feature is independent of a dimension of an input signal vector, so that scalability of the neural network is implemented.

The interaction layer of the neural network according to this embodiment of this application is set in any one of Manner 1 to Manner 3, so that the feature between the N high-dimensional signal vectors and the feature of each high-dimensional signal vector can be obtained, and the output signal vector is obtained by the operation performed at the output layer.

Figure 10A:
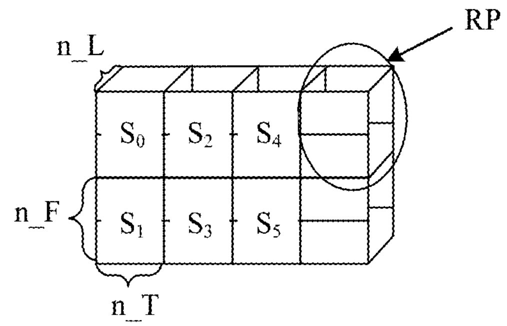
FIG. 10A is a diagram of an RP according to an embodiment of this application.

In an implementation, the communication apparatus may determine a quantity of REs included in the RP in S301. That is, the communication apparatus may determine a size of the RP in S301. Refer to FIG. 10A. An RP configuration includes three parameters that respectively correspond to a frequency domain n_F, a time domain n_T, and a space domain n_L. The RP configuration may be associated with at least one of a physical resource occupied by an input signal, for example, a time domain resource, a frequency domain resource, and a space domain resource, and a computing resource available to the communication apparatus. For example, a larger computing resource of the communication apparatus indicates a smaller RP size (n_F×n_T×n_L). For another example, a higher correlation among the time domain, the space domain, and the frequency domain occupied by the input signal indicates a larger parameter configuration of a corresponding domain. For example, assuming that a correlation between the time domain resource in the physical resource occupied by the input signal and the RP configuration is the highest, a value of n_T in the RP configuration is the largest. It may be understood that correlations between the time domain resource, the frequency domain resource, and the space domain resource that are occupied by the input signal and the RP configuration may be determined based on an empirical value. For example, if a channel occupied by the input signal changes slowly in terms of time, the correlation between the RP configuration and the time domain resource is higher. If more multipaths are occupied by the input signal and greater selectivity is in frequency domain, a correlation between the RP configuration and the frequency domain resource is lower.

In a case, the RP configuration may be indicated by a network device. For example, the communication apparatus may determine the RP configuration in a channel measurement phase. For downlink transmission, refer to FIG. 10B. The following operations may be included.

S1001A: A network device sends a channel measurement reference signal to a terminal device.

Correspondingly, the terminal device receives the channel measurement reference signal from the network device.

For example, the network device may send a channel state information reference signal (CSI-RS) to the terminal device.

S1002A: The terminal device performs channel measurement based on the channel For example, the terminal device measures quality of a downlink channel based on the channel measurement reference signal, for example, measures reference signal received power (RSRP) of the channel measurement reference signal.

S1003A: The terminal device sends configuration information of a recommended resource patch to the network device based on a result of the channel measurement and a computing resource of the terminal device.

Correspondingly, the network device receives the configuration information of the recommended resource patch from the terminal device.

For example, the terminal device may send recommended resource patch information (RPI) to the network device. The RPI may include the configuration information of the resource patch recommended by the terminal device to the network device.

S1004A: The network device sends the configuration information of the resource patch to the terminal device.

Correspondingly, the terminal device receives the configuration information of the resource patch from the network device.

For example, the network device may send resource patch information (PI) to the terminal device. The PI may include the configuration information of the resource patch that is indicated by the network device.

Figure 10B:
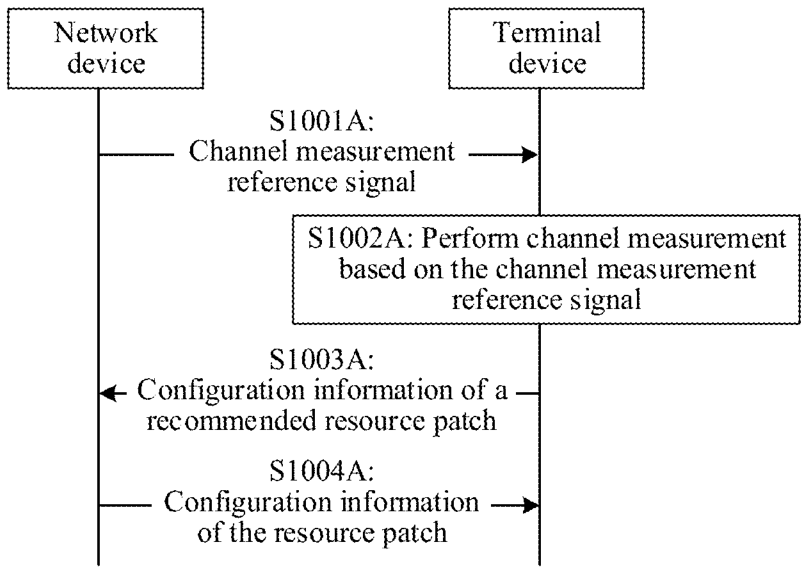
FIG. 10B is an example interaction diagram of obtaining configuration information of an RP according to an embodiment of this application.

Based on S1001A to S1004A, the terminal device may obtain the configuration information of the resource patch from the network device in the downlink channel measurement phase, so that a size of each resource patch can be determined. In FIG. 10B, the terminal device may recommend the configuration information of the resource patch to the network device, so that the configuration information of the resource patch that is determined by the network device can better conform to an actual situation of the terminal device.

Figure 10C:
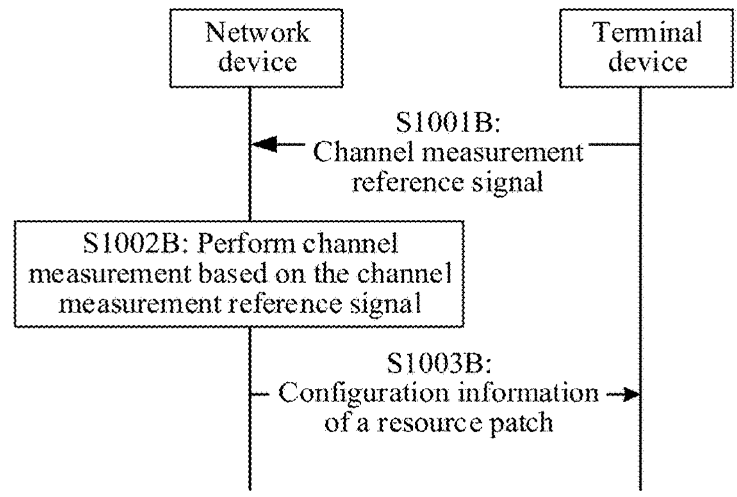
FIG. 10C is an example interaction diagram of obtaining configuration information of an RP according to an embodiment of this application.

In another case, for uplink transmission, refer to FIG. 10C. The following operations may be included.

S1001B: A terminal device sends a channel measurement reference signal to a network device.

Correspondingly, the network device receives the channel measurement reference signal from the terminal device.

For example, the terminal device may send an uplink sounding reference signal (SRS) to the network device.

S1002B: The network device performs channel measurement based on the channel measurement reference signal.

For example, the network device measures quality of an uplink channel based on the channel measurement reference signal, for example, measures RSRP of the channel measurement reference signal.

S1003B: The network device sends configuration information of a resource patch to the terminal device.

Correspondingly, the terminal device receives the configuration information of the resource patch from the network device.

For example, the network device may send PI to the terminal device.

Based on S1001B to S1003B, the terminal device may obtain the configuration information of the resource patch from the network device in an uplink channel measurement phase, so that a size of each resource patch can be determined.

The following uses Table 1 to show an example of optional configurations of the resource patch.

TABLE 1

| Optional RPI or PI configurations | |
|---|---|
| (R)PI | Optional configuration |
| n_F | 1, 2, 4, 6, 8, 12, 24, 48, 96 |
| n_T | 1, 2, 4, 6, 12, 24, 48, 96 (norm.)/1, 2, 4, 7, 14, 28, 56, 112 (ext.) |
| n_L | 1, 2, 4, 8, 16, 32, 64, 128 |

In Table 1, a configuration 1 corresponding to n_F may be considered as that the RPI or the PI may include one RE in frequency domain, a configuration 1 corresponding to n_T may be considered as that the RPI or the PI includes one symbol in time domain, a configuration 1 corresponding to n_L may be considered as that the RPI or the PI includes one stream in space domain.

In an implementation, an operation performed by an interaction layer is alternatively based on a task vector. The task vector may be for obtaining high-dimensional task information. For example, the task vector may be used as input of the interaction layer, and output of the interaction layer may be the high-dimensional task information.

It may be understood that there may be a plurality of task vectors $S_T$, and each task vector may correspond to one task, for example, tasks such as signal-to-noise ratio estimation, UE speed estimation, channel delay spread estimation, channel type detection, and channel estimation.

In a case, the task vector $S_T$ may be a pre-trained parameter. For training manners, refer to the foregoing training manners of $W^Q$, $W^K$, and $W^V$. In another case, the task vector $S_T$ may be trained based on parameters of a first interaction module and a second interaction module. For example, the communication apparatus may initialize task vector $S_T$, and the initialized task vector $S_T$ may be a random number. The communication apparatus may freeze parameters of an input layer, the first interaction module, the second interaction module, and an output layer, and train the task vector $S_T$ based on the training manners of $W^Q$, $W^K$, and $W^V$. It may be understood that freezing the parameters of the input layer, the first interaction module, the second interaction module, and the output layer may be understood as that the parameters of the input layer, the first interaction module, the second interaction module, and the output layer do not change. In other words, the communication apparatus may train the task vector $S_T$ when the parameters of the input layer, the first interaction module, the second interaction module, and the output layer do not change.

Optionally, a task layer may be further set in a neural network. An operation of the task layer is for executing a task. One or more task layers may be set, and an operation of each task layer corresponds to one task.

Figure 11A:
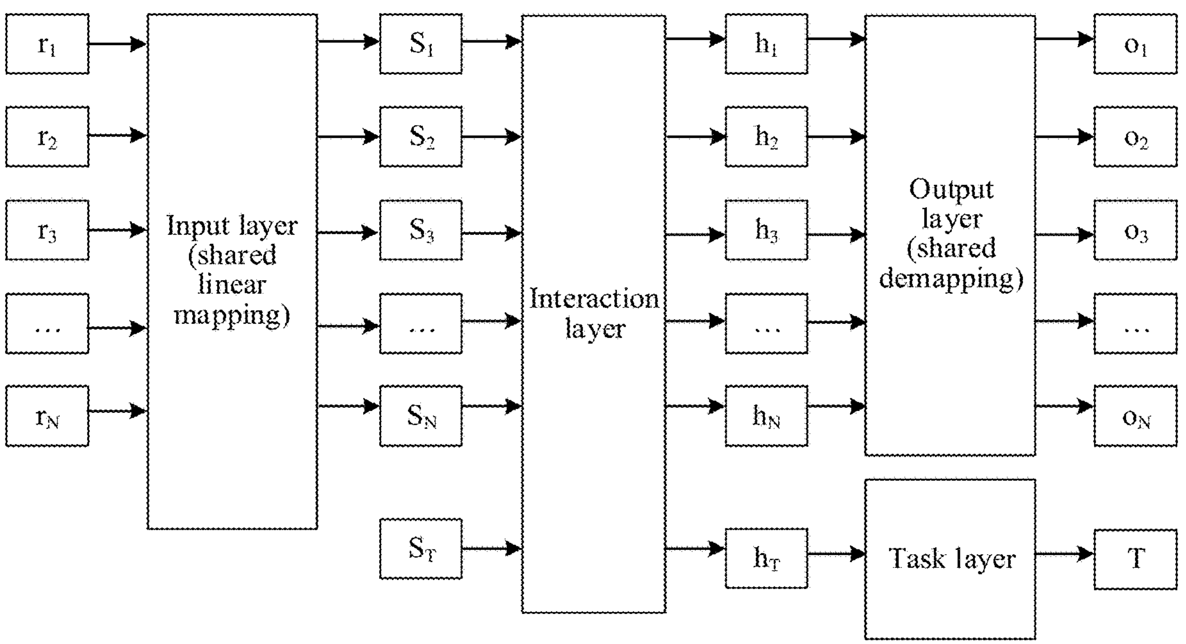
FIG. 11A is a diagram of an interaction layer of a neural network according to an embodiment of this application.

Refer to FIG. 11A. $r_1$ to $r_N$ are input of an input layer, and $S_1$ to $S_N$ are output of the input layer and input of an interaction layer. The interaction layer may obtain a feature of each high-dimensional signal vector in $S_1$ to $S_N$ and a feature between $S_1$ to $S_N$. Output of the interaction layer is $h_1$ to $h_N$. A task vector $S_T$ may obtain high-dimensional task information $h_T$ via the interaction layer. Input of an output layer is $h_1$ to $h_N$, and input of the task layer is $h_T$. The output layer may obtain output signal vectors $I_1$ to $I_N$ based on $h_1$ to $h_N$. As shown in FIG. 11A, the output signal vector may further include T, namely, target task information. The target task information is output of the task layer, and is obtained by the task layer based on $h_T$.

Figures 11B, 12:
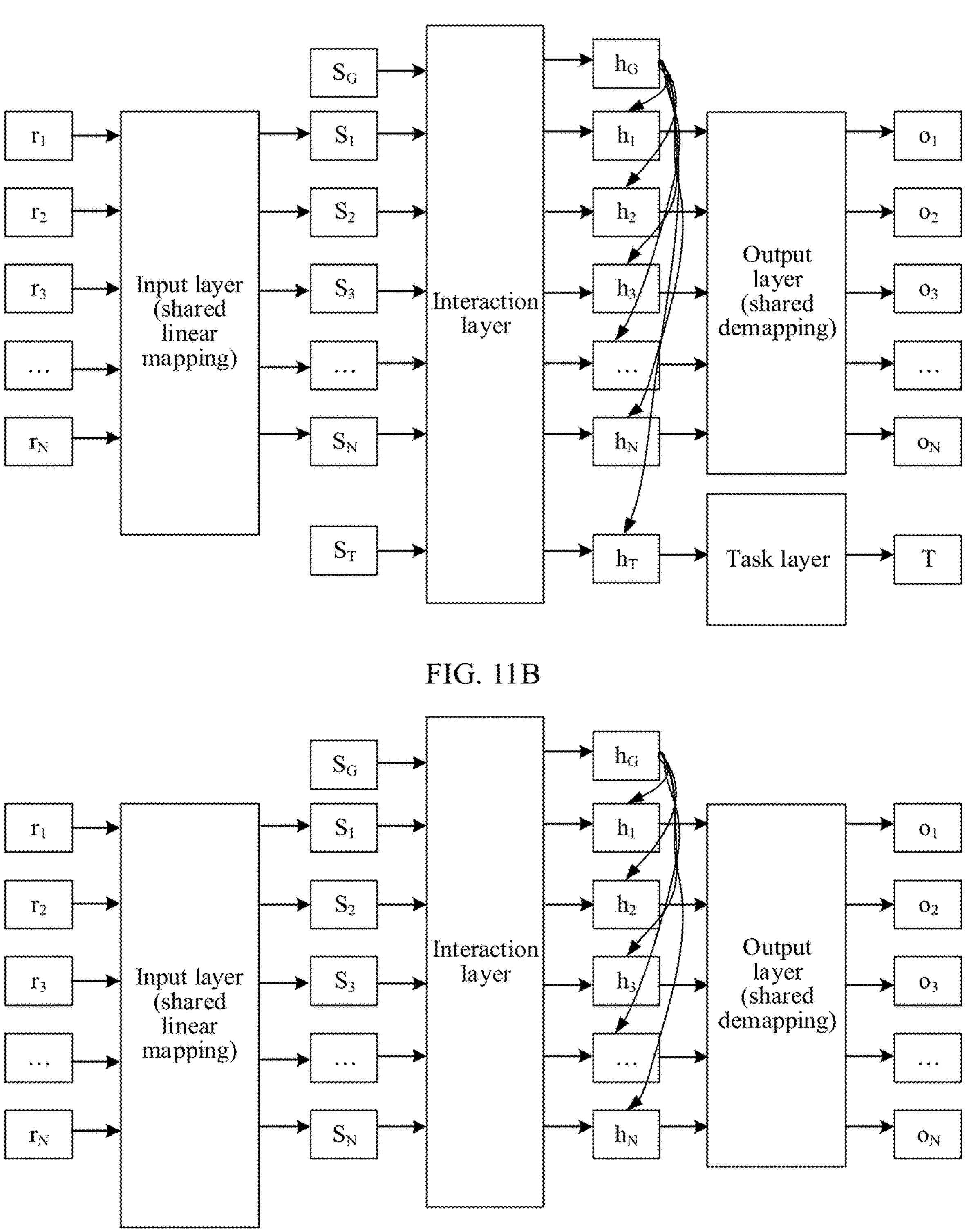
FIG. 11B is a diagram of an interaction layer of a neural network according to an embodiment of this application.
FIG. 12 is an example diagram of a receiver according to an embodiment of this application.

In another implementation, an operation performed by an interaction layer may be alternatively based on a trainable vector. The trainable vector may be used for obtaining global information of N high-dimensional signal vectors. For training manners of the trainable vector, refer to the training manners of $W^Q$, $W^K$, and $W^V$. Refer to FIG. 11B. The trainable vector is represented by $S_G$. $S_G$ may obtain $h_G$ via the interaction layer, and $h_G$ may be concatenated to each of output $h_1$ to $h_N$ of the interaction layer. As shown in FIG. 11B, $r_1$ to $r_N$ are input of an input layer, and $S_1$ to $S_N$ are output of the input layer and input of the interaction layer. The interaction layer may obtain a feature of each high-dimensional signal vector in $S_1$ to $S_N$ and a feature between $S_1$ to $S_N$. Optionally, as shown in FIG. 11B, the global information $h_G$ may also be concatenated to high-dimensional task information $h_T$. For example, the global information $h_G$ may be concatenated before the high-dimensional task information $h_T$. Optionally, the global information $h_G$ may alternatively be concatenated after the high-dimensional task information $h_T$. It may be understood that a manner of concatenating the global information and the high-dimensional task information may be the same as the foregoing manner of concatenating the feature between the global information and the high-dimensional signal vector output by the interaction layer and the feature of the high-dimensional signal vector. Input of an output layer is $h_1$ to $h_N$, and input of a task layer is $h_T$. The output layer may obtain output signal vectors $I_1$ to $I_N$ based on $h_1$ to $h_N$. As shown in FIG. 11B, the output signal vector may further include T, namely, target task information. The target task information is output of the task layer, and is obtained by the task layer based on $h_T$.

The following uses an orthogonal frequency division multiplexing (OFDM) system as an example to describe an application scenario of a signal processing method according to embodiments of this application. FIG. 12 is an example of a receiver of a communication apparatus according to an embodiment of this application. The communication apparatus may receive data from another communication apparatus. Input of the receiver may be a received signal r obtained after operations such as cyclic prefix (CP) removal and fast Fourier transform (FFT) are performed on a physical baseband signal. The communication apparatus may map, to N RPs, the signal r obtained after the operations such as the CP removal and the FFT are performed. Each RP includes one signal vector. As shown in FIG. 12, an input layer performs dimension increase processing on $r_1$ to $r_N$, to obtain high-dimensional signal vectors $S_1$ to $S_N$. A feature of a high-dimensional signal vector and features $h_1$ to $h_N$ between the high-dimensional signal vectors are obtained after $S_1$ to $S_N$ pass through the interaction layer. After $h_1$ to $h_N$ pass through an output layer, log-likelihood ratios $I_1$ to $I_N$ corresponding to each transmission bit are obtained. Optionally, an operation of the interaction layer may further be based on a trainable vector $S_G$. Global information $h_T$ of the high-dimensional signal vector may be obtained after $S_G$ passes via the interaction layer, and the global information $h_T$ is concatenated to $h_1$ to $h_N$ as output of the output layer.

The receiver may directly and jointly detect a signal of an entire frame. The receiver may map the signal of the entire frame to N resource patches by using a resource patch, and increase a dimension of a signal included in each resource patch to $d_k$, and a feature of each high-dimensional signal vector and a feature between N high-dimensional signal vectors are obtained by using a neural network. Therefore, complexity of jointly detecting the signal of the entire frame can be reduced, and better performance can be obtained. In addition, the receiver does not display a channel estimation process and a channel equalization process, so that the complexity of signal processing can be reduced.

Figure 13:
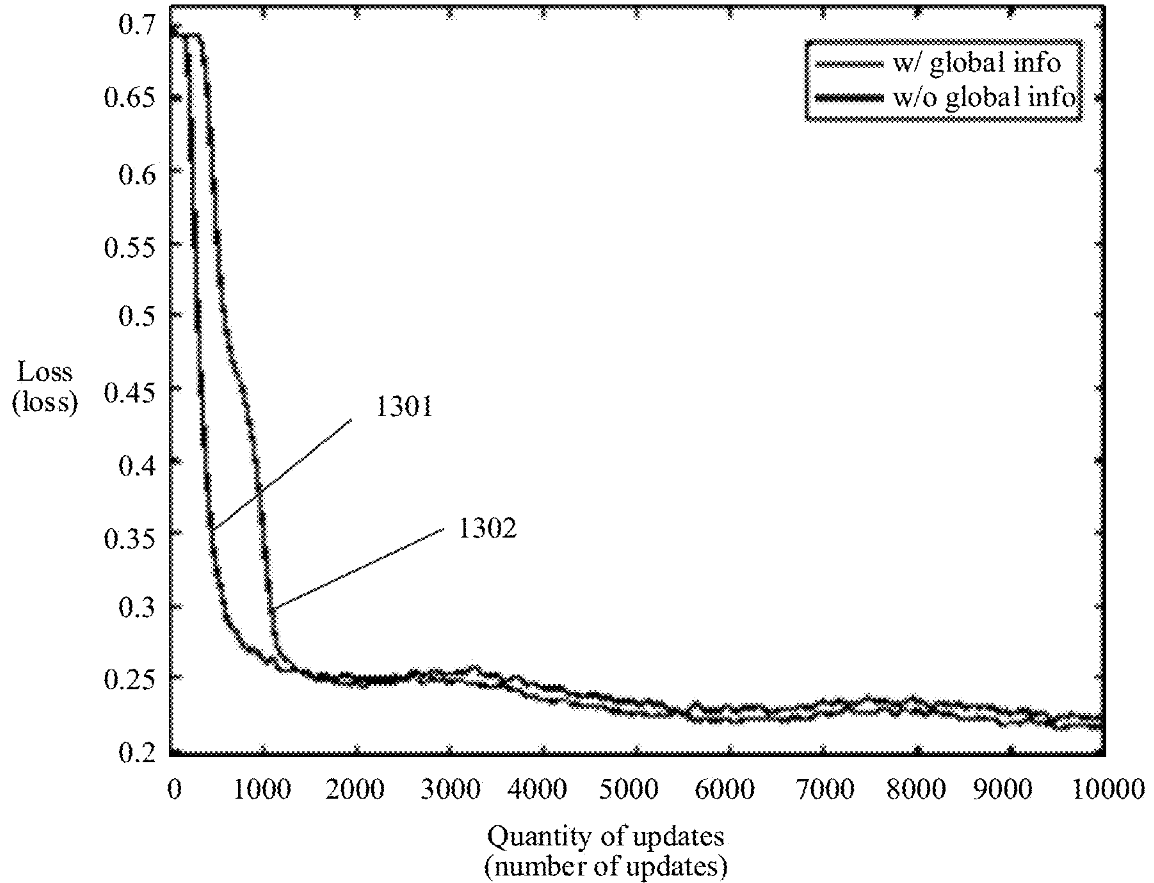
FIG. 13 is a curve chart of a change of a training loss of a neural network according to an embodiment of this application.

FIG. 13 shows a change of a training loss of a neural network in a training process, and compares performance 1301 with $S_G$ and performance 1302 without $s_G$ in a neural network structure. In FIG. 13, a vertical coordinate indicates a value of a loss function, and a faster decrease of the value of the vertical coordinate represents a faster convergence speed. In FIG. 13, a horizontal coordinate indicates a quantity of parameter update times. It can be learned that when the neural network does not include $s_G$, because a quantity of parameters of the neural network is smaller, the convergence speed is faster; and when the neural network includes $s_G$, the performance finally achieved is better.

Figure 14:
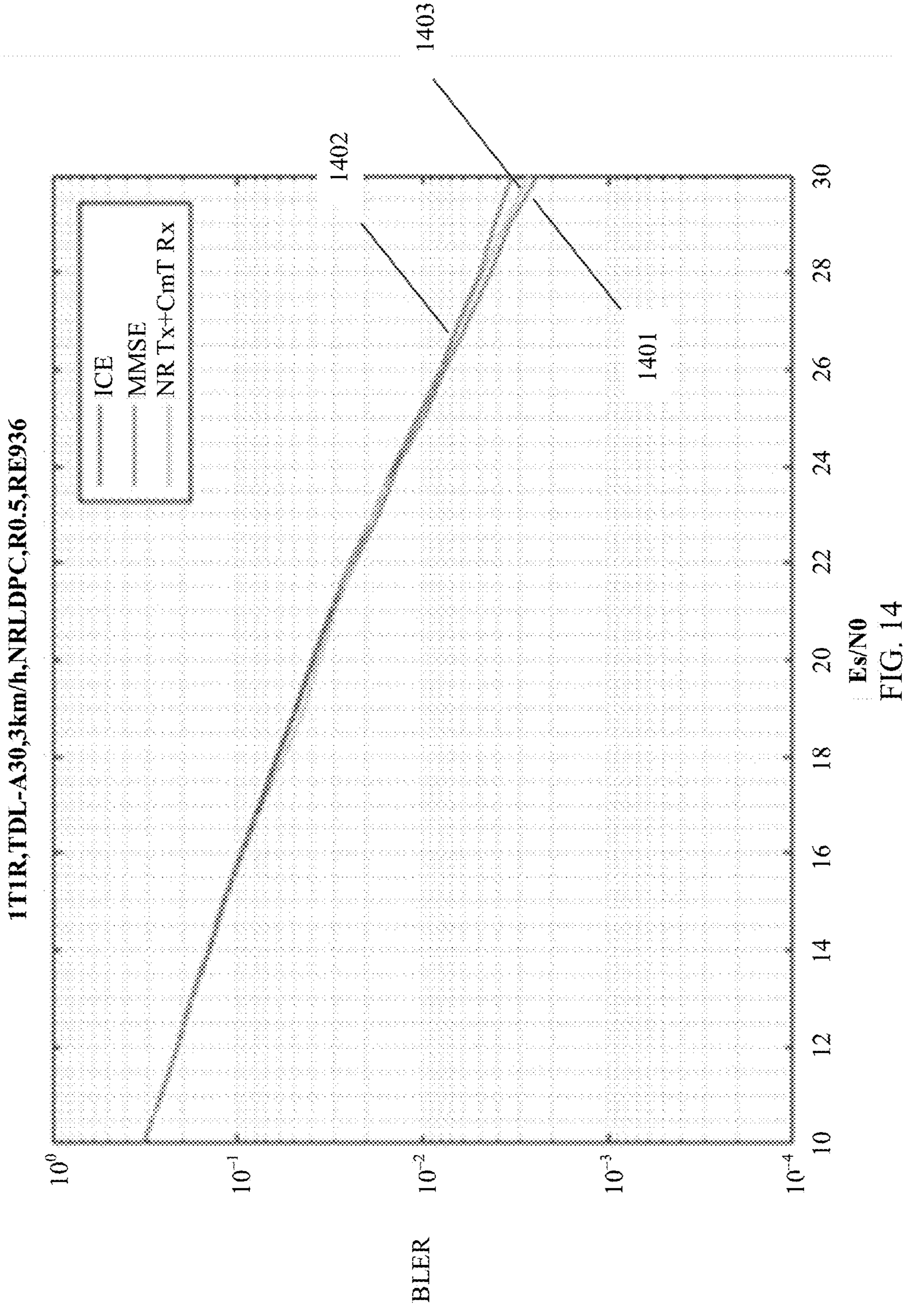
FIG. 14 is a curve chart of performance of a receiver according to an embodiment of this application.

FIG. 14 compares performance of a receiver that uses a neural network according to this embodiment of this application in a one transmitter one receiver configuration. In FIG. 14, a horizontal coordinate indicates a signal-to-noise ratio, and a vertical coordinate indicates a bit error rate. When signal-to-noise ratios are the same, a lower value of the vertical coordinate represents better performance. A curve 1401 corresponding to ideal channel estimation (ICE) represents performance of the receiver in an ICE condition. A curve 1402 corresponding to minimum mean square error channel estimation (MMSE) represents performance of the receiver in an MMSE condition, and the performance of the ICE may be considered as an upper limit of the performance. It can be learned from FIG. 14 that performance 1403 of the receiver that uses the neural network according to this embodiment of this application is better than that of the MMSE, and is close to the upper limit of the performance.

Figure 15:
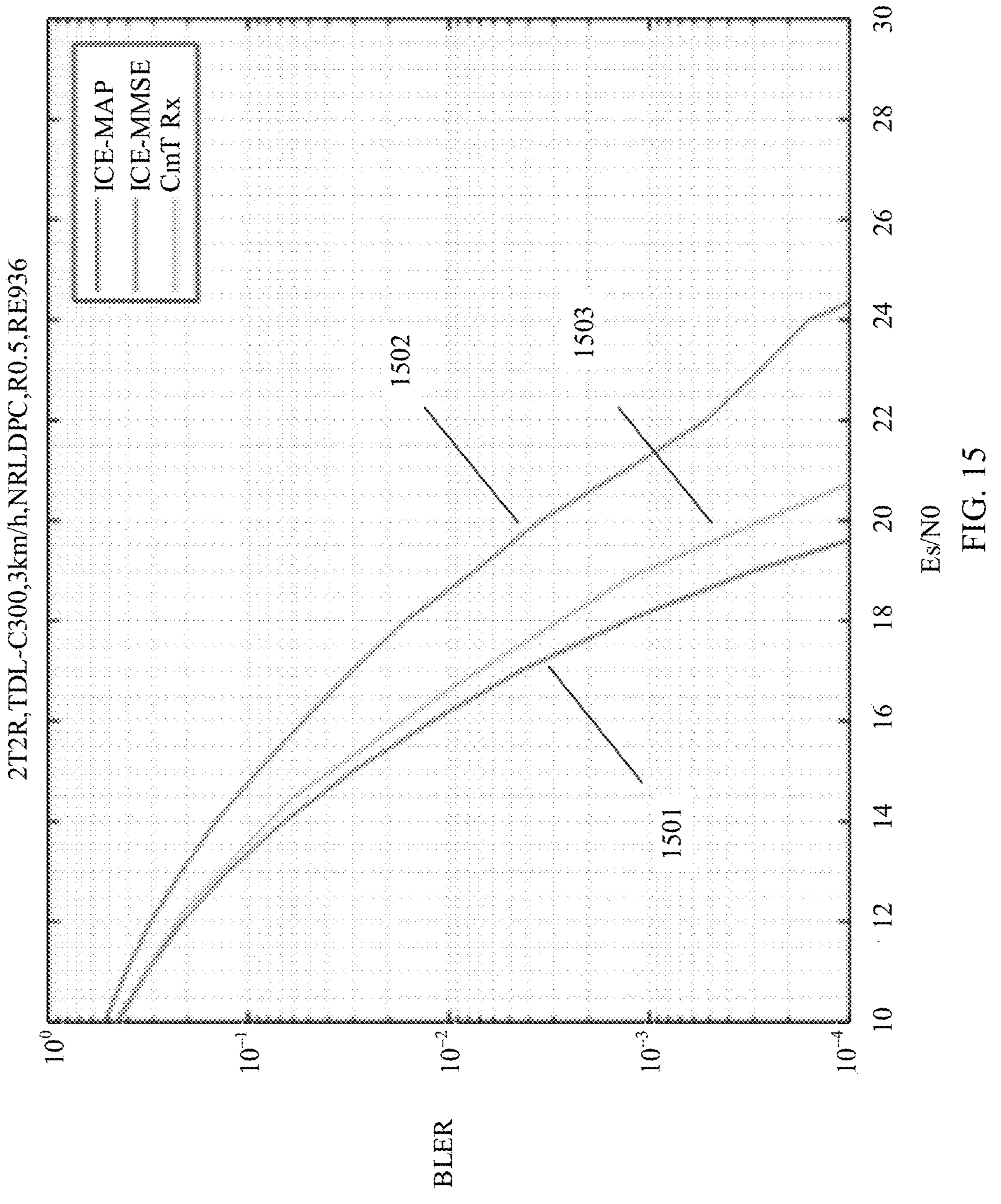
FIG. 15 is a curve chart of performance of a receiver according to an embodiment of this application.

FIG. 15 compares performance of a receiver that uses a neural network according to this embodiment of this application in a two transmitter two receiver configuration. In FIG. 15, a horizontal coordinate indicates a signal-to-noise ratio, and a vertical coordinate indicates a bit error rate. When signal-to-noise ratios are the same, a lower value of the vertical coordinate represents better performance. A curve 1501 corresponding to ICE maximum posterior probability (MAP) represents performance of the receiver in a condition of ideal channel estimation+maximum posterior and the ideal channel estimation. A curve 1502 corresponding to ICE-MMSE represents performance of the receiver in a condition of the ideal channel estimation+minimum mean square error channel estimation. Performance of ICE-MAP can be considered as an upper limit of the performance. It can be learned from a result that performance 1503 of the receiver shown in FIG. 15 is far better than that of the ICE-MMSE and is close to the upper limit of the performance.

The following describes, by using accompanying drawings, an application scenario of a signal processing method according to embodiments of this application.

Figure 16A:
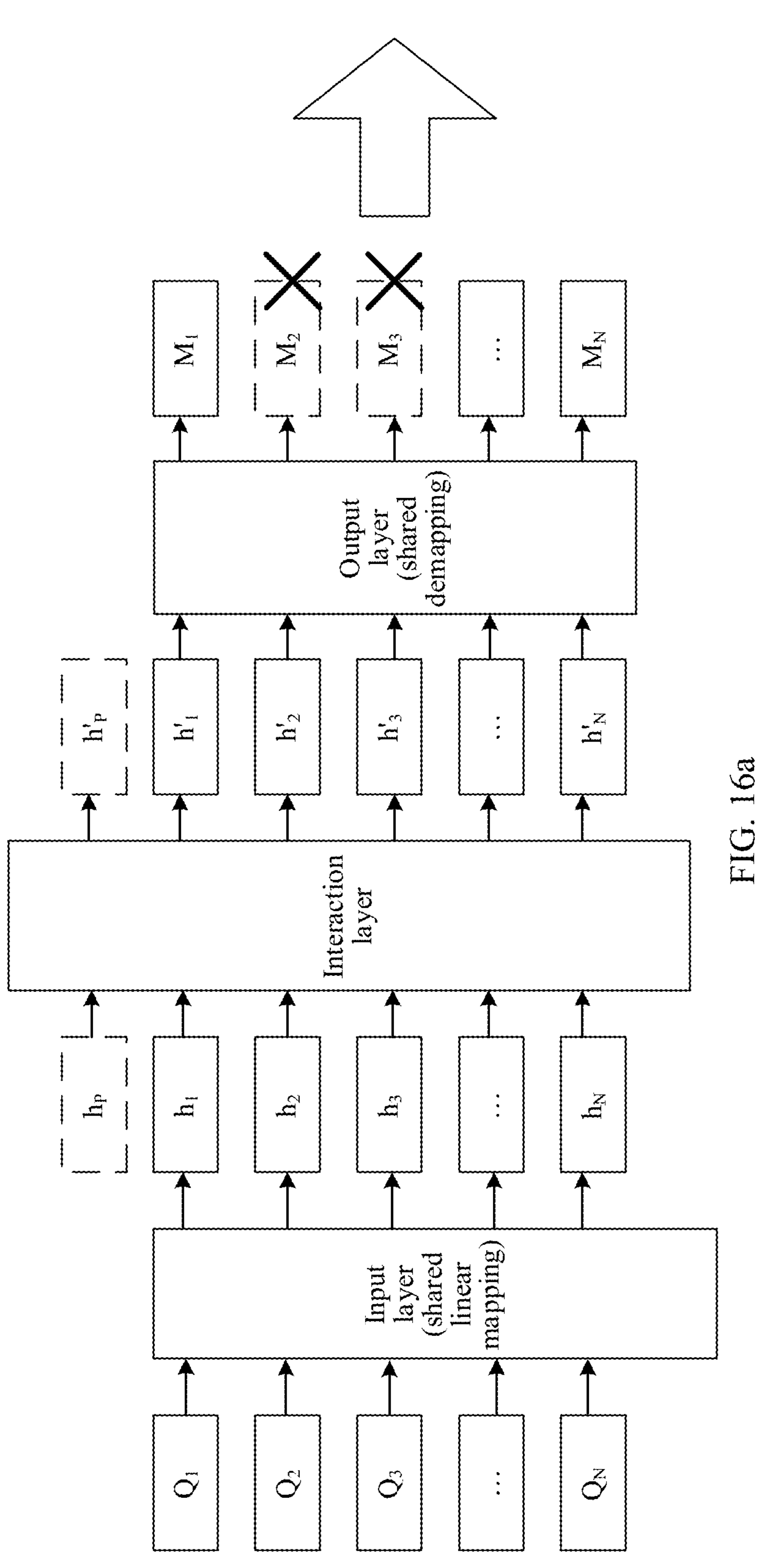
FIG. 16*a* is an example diagram of a transmitter according to an embodiment of this application.
Figure 16B:
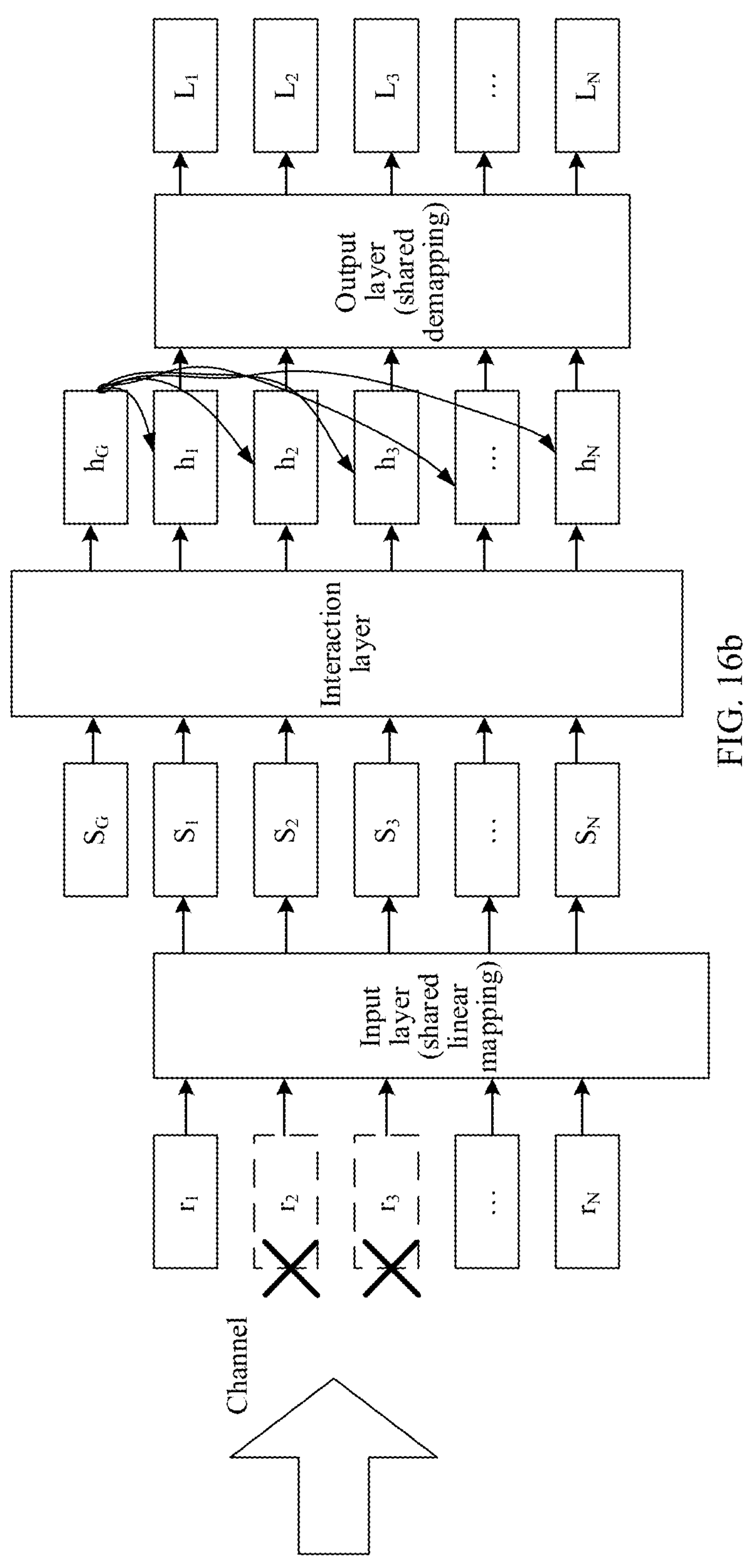
FIG. 16*b* is an example diagram of a receiver according to an embodiment of this application.

FIG. 16*a* and FIG. 16*b* show an example of a transmitter and an example of a receiver according to embodiments of this application. In the embodiment shown in FIG. 16*a*, an example in which a transmitter is used for a network device and a receiver is used for a terminal device is used for description. FIG. 16*a* shows the transmitter. Output M of the transmitter is a transmission symbol, and there may be one or more M. M in FIG. 16*a* may include $M_1$ to $M_N$. It may be understood that a waveform may be generated when the transmission symbol passes through a waveform generation module. For example, inverse fast Fourier transform (IFFT) is performed on the transmission symbol to generate an OFDM symbol. After mapping output M to a physical resource, the network device may send output M to the terminal device.

In a case, input of the transmitter may be a to-be-encoded bit, the transmitter may encode the to-be-encoded bit, and output of the transmitter may be an encoded bit stream. A device at a transmitting end, for example, the network device, may modulate the encoded bit stream to obtain the transmission symbol. In another case, input of the transmitter may be an encoded bit stream. In this case, the transmitter may map the encoded bit stream to the transmission symbol, and output of the transmitter may be the transmission symbol. A device at a transmitting end, for example, the network device, may perform channel coding on a bit stream to be encoded, to obtain the encoded bit stream, and use the encoded bit stream as the input of the transmitter. In still another case, input of the transmitter may be a bit stream to be encoded, the transmitter may perform channel coding on the bit stream to be encoded and map a transmission symbol, and output of the transmitter may be the transmission symbol. In yet another case, input of the transmitter may be a modulation symbol, the transmitter may map from the modulation symbol to a transmission symbol, and output of the transmitter may be the transmission symbol.

An example in which input of an input layer in the transmitter is a modulation symbol is used for description. The network device may perform channel coding on a bit stream to be encoded, to obtain an encoded bit stream. After modulating the encoded bit stream to obtain the modulation symbol, the network device may use the modulation symbol as the input of the transmitter, and input the modulation symbol to the transmitter. FIG. 16*a* is an example of the transmitter, and a neural network in the transmitter may obtain modulation symbols $Q_1$ to $Q_N$. The modulation symbols $Q_1$ to $Q_N$ may be used as the input of the input layer. The input layer may perform dimension increase processing on the modulation symbols $Q_1$ to $Q_N$, to obtain high-dimensional modulation symbols $h_1$ to $h_N$. An interaction layer may obtain a feature between the modulation symbols and a feature of each modulation symbol from $h'_1$ to $h'_N$ based on $h_1$ to $h_N$. Input of an output layer is $h'_1$ to $h'_N$, and the output layer may perform dimension reduction on $h'_1$ to $h'_N$ and obtain an aliased transmission symbol. The network device may send the transmission symbol to the terminal device. The terminal device receives the transmission symbol. For differentiation, the transmission symbol received by the terminal device is described as a received symbol. The terminal device may map the received symbol to an RP, to obtain signal vectors $r_1$ to $r_N$ of the received symbol. The terminal device may input the signal vectors $r_1$ to $r_N$ to the receiver. FIG. 16*b* is an example of the receiver. An input layer of the receiver may perform dimension increase processing on the signal vectors $r_1$ to $r_N$, to obtain $S_1$ to $S_N$. Input of an interaction layer is $S_1$ to $S_N$, and the interaction layer may obtain a feature of each signal vector and features $h_1$ to $h_N$ between signal vectors based on $S_1$ to $S_N$. An output layer may obtain log-likelihood ratios $L_1$ to $L_N$ of each received symbol based on $h_1$ to $h_N$, for channel decoding. Optionally, in the transmitter, input $h_p$ of an interaction layer is optional, may be a preset or trainable vector, and is mapped to a transmission symbol in an aliased manner to function as a pilot. Optionally, in the receiver, the input $S_G$ of the interaction layer is optional, and may be a preset or trainable vector for obtaining global information of $S_1$ to $S_N$. Details are not described herein.

In an implementation, the transmitter may obtain puncturing information. The transmitter may puncture output of the output layer based on the puncturing information. In the output M of the output layer of the transmitter, $M_2$ and $M_3$ represent that puncturing is performed. In other words, transmission symbols corresponding to the two pieces of output are not sent. Because $M_2$ and $M_3$ are punctured, the receiver cannot receive $M_2$ and $M_3$. To perform channel decoding, the receiver may obtain the puncturing information. As shown in FIG. 16*b*, before the interaction layer in the receiver, a trainable filling vector is set at a puncturing position, to restore a punctured symbol. The filling vector is trainable, and may be trained in a gradient backpropagation manner. For example, the receiver may add the filling vector to the corresponding puncturing position based on the puncturing information.

In an case, the network device may obtain the puncturing information based on a puncture rate (PR). The PR indicates a percentage of the punctured symbol. For example, Table 2 shows some optional PR configurations.

TABLE 2

| Optional PR configurations | |
|---|---|
| PR | Optional configuration |
| 00 | 5% |
| 01 | 10% |
| 10 | 15% |
| 11 | 20% |

For example, the network device may calculate the puncturing information based on the optional PR configurations shown in Table 2. For example, the network device may puncture the transmission symbol according to the following formulas:

$$\Delta = \text{floor}\left(\frac{N_P - 2 - n_p}{n_p}\right)$$

and $n_p=\text{floor}(PR\times N_p)$, and the puncturing position is $[1, 1+\Delta, \ldots, 1+(n_p-1)\Delta]$. Optionally, the network device may reserve the first transmission symbol and the last transmission symbol, and evenly puncture symbols. $N_p$ represents a quantity of resource patches, $n_p$ represents a quantity of puncturing positions, and $\Delta$ represents a puncturing interval.

The network device may puncture, based on the obtained puncturing information, the symbol output by the output layer, for example, $x_1$ and $x_2$ shown in FIG. 16*a*. In a case, the network device may indicate consecutive puncturing positions based on punctured symbol information (for example: puncture pattern indication, PPI). The PPI indicates a sequence number of a punctured resource patch, and the PPI may indicate a start position of the sequence number of the punctured resource patch. In another case, the network device may use a bitmap to indicate a puncturing position for inconsecutive puncturing. The transmitter and the receiver may synchronize the puncturing information. In other words, the network device and the terminal device may synchronize the puncturing information. For example, the network device may send the puncturing information to the receiver by using signaling. For example, the network device may send the puncturing information to the terminal device by using downlink control information (DCI) or radio resource control (RRC) signaling. The puncturing information may include at least one of the PR and the PPI. In this way, the terminal device may obtain a quantity of punctures by using the PR, and obtain the puncturing position based on the PPI.

In an implementation, the transmitter and the receiver may synchronize configuration information of the resource patch. In other words, the network device and the terminal device may synchronize the configuration information of the resource patch. For a manner in which the network device and the terminal device synchronizes the configuration information of the resource patch, refer to FIG. 10B and FIG. 10C. Details are not described herein again.

In the transmitter and the receiver shown in FIG. 16*a* and FIG. 16*b*, parameters of the transmitter and the receiver may be jointly trained. A function of joint training is to alias information included in a punctured resource patch to a symbol sent by a resource patch that is not punctured, so that interaction information between a receiving end and the transmitting end is maximized, and a bit error rate is reduced.

Figure 17A:
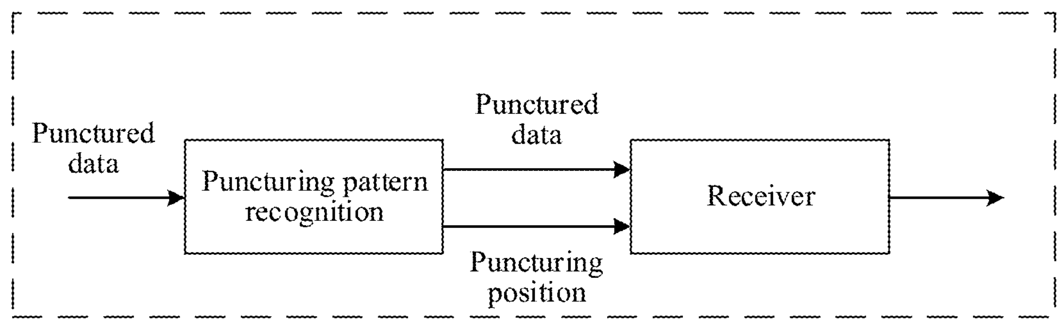
FIG. 17*a* is a diagram of a communication scenario of a receiver according to an embodiment of this application.
Figure 17B:
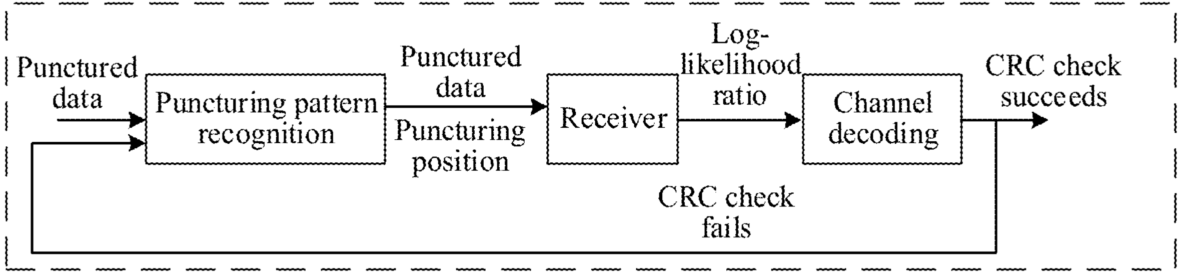
FIG. 17*b* is a diagram of a communication scenario of a receiver according to an embodiment of this application.
Figure 17C:
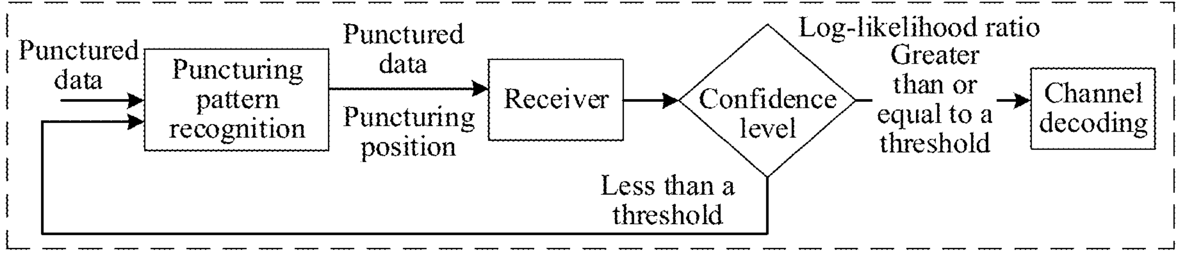
FIG. 17*c* is a diagram of a communication scenario of a receiver according to an embodiment of this application.

Refer to FIG. 17*a*, FIG. 17*b*, and FIG. 17*c*. An embodiment of this application provides a manner of blindly detecting a puncturing position. As shown in FIG. 17*a*, FIG. 17*b*, and FIG. 17*c*, when a receiver does not synchronize puncturing information, the receiver may obtain correct puncturing information through blind detection, so that the puncturing information can be used for filling the puncturing position and performing receiving. Optionally, embodiments shown in FIG. 17*a*, FIG. 17*b*, and FIG. 17*c* may be applied to a scenario in which enhanced mobile broadband (eMBB) and ultra-reliable and low latency communication (uRLLC)

coexist. For example, a communication apparatus may puncture a scheduled eMBB resource by using a neural network, map uRLLC data to the punctured resource, and send punctured eMBB and uRLLC data.

Refer to FIG. 17*a*. A terminal device may receive punctured data. The terminal device may perform puncturing pattern recognition on the punctured data, to determine a puncturing position. Optionally, the puncturing pattern recognition may be implemented by using the neural network. For example, the terminal device may map the punctured data to a resource patch to obtain a signal vector of the punctured data. The terminal device may input the signal vector of the punctured data into the neural network, and output of the neural network is a puncturing position. It may be understood that the neural network may include a structure in Manner 1, Manner 2, or Manner 3.

The terminal device may map the puncturing position and the punctured data to the resource patch to obtain a signal vector of the puncturing position and the signal vector of the punctured data. The terminal device may input the signal vector of the puncturing position and the signal vector of the punctured data to a receiver. A neural network of the receiver may complete the operations shown in FIG. 3. For example, output of an output layer may be a log-likelihood ratio or the like. In other words, an output signal vector may be a log-likelihood ratio of the punctured data.

Refer to FIG. 17*b*. A terminal device may receive punctured data. The terminal device may perform puncturing pattern recognition on the punctured data to determine a puncturing position. The terminal device may map the puncturing position and the punctured data to the resource patch to obtain a signal vector of the puncturing position and a signal vector of the punctured data. The terminal device may input one of the signal vector of the puncturing position and the signal vector of the punctured data to a receiver. A neural network of the receiver may complete the operations shown in FIG. 3. For example, output of an output layer may be a log-likelihood ratio. After the terminal device performs channel decoding by using the log-likelihood ratio, if a CRC check fails, the terminal device returns for an operation of performing puncturing pattern recognition on the punctured data to determine the puncturing position, until the CRC check succeeds or all puncturing positions are traversed.

Refer to FIG. 17*c*. A terminal device may receive punctured data. The terminal device may perform puncturing pattern recognition on the punctured data to determine a puncturing position. The terminal device may map the puncturing position and the punctured data to the resource patch to obtain a signal vector of the puncturing position and a signal vector of the punctured data. The terminal device may input one of the signal vector of the puncturing position and the signal vector of the punctured data to a receiver. If a confidence level is greater than or equal to a set threshold, a generated log-likelihood ratio is for channel decoding. If a confidence level is less than a set threshold, the terminal device may return for an operation of performing puncturing pattern recognition on the punctured data to determine the puncturing position, until the confidence level is greater than the threshold or all puncturing positions are traversed. Measurement of the confidence level may be implemented by using a task vector.

Figure 18:
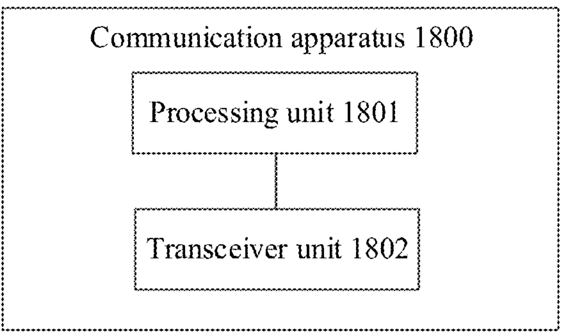
FIG. 18 is a diagram of a communication apparatus according to an embodiment of this application.

Based on a concept of the foregoing embodiment, refer to FIG. 18. An embodiment of this application provides a communication apparatus 1800. The apparatus 1800 includes a processing unit 1801 and a transceiver unit 1802. The apparatus 1800 may be a communication apparatus, or may be an apparatus that is used in a communication apparatus and that can support the communication apparatus in performing a signal processing method.

The transceiver unit may also be referred to as a transceiver module, a transceiver, a transceiver machine, a transceiver apparatus, or the like. The processing unit may also be referred to as a processor, a processing board, a processing unit, a processing apparatus, or the like. Optionally, a component that is in the transceiver unit and that is configured to implement a receiving function may be considered as a receiving unit. It should be understood that the transceiver unit is configured to perform a sending operation and a receiving operation of the communication apparatus in the foregoing method embodiments, and a component that is in the transceiver unit and that is configured to implement a sending function is considered as a sending unit. That is, the transceiver unit includes the receiving unit and the sending unit.

In addition, it should be noted that, if the apparatus is implemented by using a chip/chip circuit, the transceiver unit may be an input/output circuit and/or a communication interface, and perform an input operation (corresponding to the foregoing receiving operation) and an output operation (corresponding to the foregoing sending operation); and the processing unit is an integrated processor, a microprocessor, or an integrated circuit.

The following describes in detail an implementation in which the apparatus 1800 is used in the communication apparatus.

For example, when the apparatus 1800 is used in the communication apparatus, operations performed by units of the apparatus 1800 are described in detail.

The transceiver unit 1802 is configured to obtain an input signal.

The processing unit 1801 is configured to: map the input signal to N1 resource patches RPs, where the RP includes one or more resource elements REs, and each RP includes one signal vector determined based on the input signal; input N1 signal vectors to an input layer of a neural network for dimension increase processing, to obtain N2 high-dimensional signal vectors; input the N2 high-dimensional signal vectors to an interaction layer of the neural network, to obtain a feature between the N2 high-dimensional signal vectors and a feature of each high-dimensional signal vector; and input the feature between the N2 high-dimensional signal vectors and the feature of each high-dimensional signal vector to an output layer of the neural network for an operation, to obtain an output signal vector.

Figure 19:
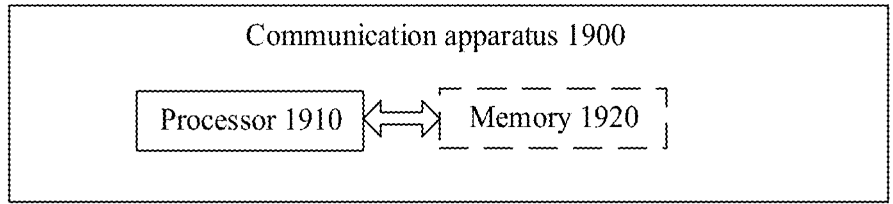
FIG. 19 is a diagram of a communication apparatus according to an embodiment of this application.

Based on a concept of the embodiment, as shown in FIG. 19, an embodiment of this application provides a communication apparatus 1900. The communication apparatus 1900 includes a processor 1910. Optionally, the communication apparatus 1900 may further include a memory 1920, configured to store instructions executed by the processor 1910, store input data required by the processor 1910 to run instructions, or store data generated after the processor 1910 runs instructions. The processor 1910 may implement, by using the instructions stored in the memory 1920, the method shown in the foregoing method embodiments.

Figure 20:
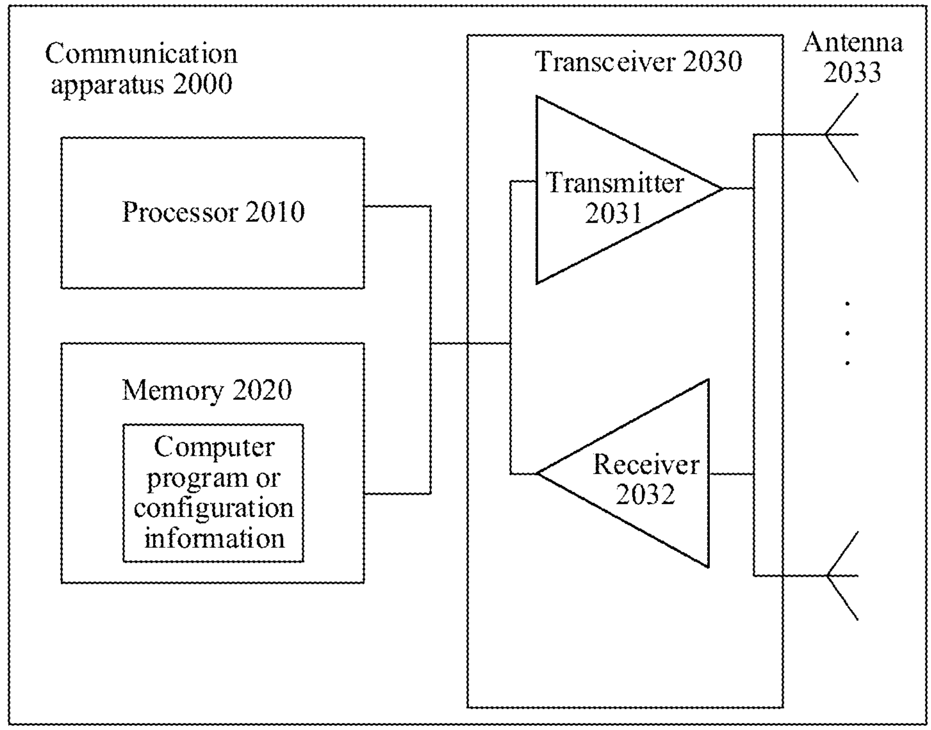
FIG. 20 is a diagram of a communication apparatus according to an embodiment of this application.

Based on a concept of the embodiment, as shown in FIG. 20, an embodiment of this application provides a communication apparatus 2000. The communication apparatus 2000 may be a chip or a chip system. Optionally, in this embodiment of this application, the chip system may include a chip, or may include a chip and another discrete component.

The communication apparatus 2000 may include at least one processor 2010. The processor 2010 is coupled to a memory. Optionally, the memory may be located inside the apparatus, or may be located outside the apparatus. For example, the communication apparatus 2000 may further include at least one memory 2020. The memory 2020 stores a computer program, configuration information, a computer program or instructions, and/or data necessary for implementing any one of the foregoing embodiments. The processor 2010 may execute the computer program stored in the memory 2020, to complete the method in any one of the foregoing embodiments. Optionally, the memory may be integrated with the processor.

The coupling in this embodiment of this application may be an indirect coupling or a communication connection between apparatuses, units, or modules in an electrical form, a mechanical form, or another form, and is used for information exchange between the apparatuses, the units, or the modules. The processor 2010 may cooperate with the memory 2020. In this embodiment of this application, a connection medium among the transceiver 2030, the processor 2010, and the memory 2020 is not limited.

The communication apparatus 2000 may further include a transceiver 2030, and the communication apparatus 2000 may exchange information with another device by using the transceiver 2030. The transceiver 2030 may be a circuit, a bus, a transceiver, or any other apparatus that may be configured to exchange information, or is referred to as a signal transceiver unit. As shown in FIG. 20, the transceiver 2030 includes a transmitter 2031, a receiver 2032, and an antenna 2033. In addition, when the communication apparatus 2000 is a chip-type apparatus or circuit, the transceiver in the communication apparatus 2000 may alternatively be an input/output circuit and/or a communication interface, and may input data (or is referred to as receiving data) and output data (or is referred to as sending data). The processor is an integrated processor, a microprocessor, or an integrated circuit, and the processor may determine output data based on input data.

In an implementation, the communication apparatus 2000 may be used in a communication apparatus. The communication apparatus 2000 may be a communication apparatus, or may be an apparatus that can support a communication apparatus and implement a function of the communication apparatus in any one of the foregoing embodiments. The memory 2020 stores a computer program, a computer program or instructions, and/or data necessary for implementing a function of the communication apparatus in any one of the foregoing embodiments. The processor 2010 may execute the computer program stored in the memory 2020 to complete the method performed by the communication apparatus in any one of the foregoing embodiments.

The communication apparatus 2000 according to this embodiment may be used in the communication apparatus to complete the method performed by the foregoing communication apparatus. Therefore, for technical effects that can be achieved by this embodiment, refer to the foregoing method embodiments. Details are not described herein again.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, for example, a hard disk drive (HDD) or a solid-state drive (SSD), or may be a volatile memory, for example, a random access memory (RAM). Alternatively, the memory may be any other medium that can be configured to carry or store expected program code in a form of an instruction or a data structure and that can be accessed by a computer, but is not limited thereto. The memory in embodiments of this application may alternatively be a circuit or any other apparatus that can implement a storage function, and is configured to store a computer program, a computer program or instructions, and/or data.

Figure 21:
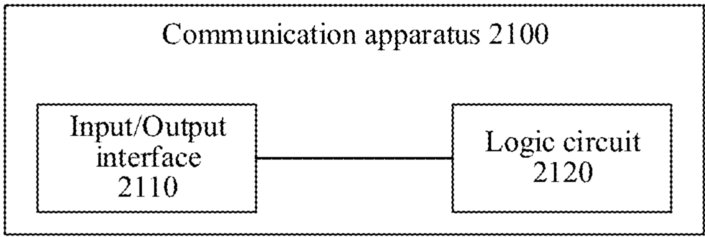
FIG. 21 is a diagram of a communication apparatus according to an embodiment of this application.

Based on the foregoing embodiments, refer to FIG. 21. An embodiment of this application further provides another communication apparatus 2100, including an input/output interface 2110 and a logic circuit 2120. The input/output interface 2110 is configured to receive code instructions and transmit the code instructions to the logic circuit 2120; and the logic circuit 2120 is configured to run the code instructions to perform the method performed by the communication apparatus in any one of the foregoing embodiments.

The following describes in detail an operation performed when the communication apparatus is used in a communication apparatus.

In an optional implementation, the communication apparatus 2100 may be used in the communication apparatus to perform the method performed by the communication apparatus, for example, the method performed by the communication apparatus in the embodiment shown in FIG. 3. The input/output interface 2110 is configured to obtain an input signal. The logic circuit 2120 is configured to: map the input signal to N1 resource patches RPs, where the RP includes one or more resource elements REs, and each RP includes one signal vector determined based on the signal; input N1 signal vectors to an input layer of a neural network for dimension increase processing, to obtain N2 high-dimensional signal vectors; input the N2 high-dimensional signal vectors to an interaction layer of the neural network, to obtain a feature between the N2 high-dimensional signal vectors and a feature of each high-dimensional signal vector; and input the feature between the N2 high-dimensional signal vectors and the feature of each high-dimensional signal vector to an output layer of the neural network for an operation, to obtain an output signal vector.

The communication apparatus 2100 according to this embodiment may be used in the communication apparatus to perform the method performed by the foregoing communication apparatus. Therefore, for technical effects that can be achieved by this embodiment, refer to the foregoing method embodiments. Details are not described herein again.

Based on the foregoing embodiments, an embodiment of this application further provides a communication system. The system includes at least one communication apparatus and at least one other communication apparatus. For technical effects that can be achieved by this embodiment, refer to the foregoing method embodiments. Details are not described herein again.

Based on the foregoing embodiments, an embodiment of this application further provides a computer-readable storage medium. The computer-readable storage medium stores a computer program or instructions. When the instructions are executed, the method performed by the communication apparatus in any one of the foregoing embodiments is implemented. The computer-readable storage medium may include: any medium that can store program code, such as a USB flash drive, a removable hard disk, a read-only memory, a random access memory, a magnetic disk, or an optical disc.

To implement functions of the communication apparatus in FIG. 18 to FIG. 21, an embodiment of this application further provides a chip, including a processor, configured to support the communication apparatus in implementing the functions of the communication apparatus in the foregoing method embodiments. In a design, the chip is connected to a memory, or the chip includes a memory. The memory is configured to store a computer program or instructions and data that are necessary for the communication apparatus.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that a computer program or instructions may be used to implement each procedure and/or each block in the flowcharts and/or the block diagrams and a combination of a procedure and/or a block in the flowcharts and/or the block diagrams. The computer program or instructions may be provided for a general-purpose computer, a dedicated computer, an embedded processor, or a processor of another programmable data processing device to generate a machine, so that the instructions executed by the computer or the processor of another programmable data processing device generate an apparatus for implementing a function in one or more procedures in the flowcharts and/or in one or more blocks in the block diagrams.

The computer program or instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

The computer program or instructions may alternatively be loaded onto the computer or the another programmable data processing device, so that a series of operation steps are performed on the computer or the another programmable device to generate computer-implemented processing. Therefore, the instructions executed on the computer or the another programmable device provide steps for implementing a function in one or more procedures in the flowcharts and/or in one or more blocks in the block diagrams.

A person skilled in the art may make various modifications and variations to embodiments of this application without departing from the scope of embodiments of this application. In this case, this application is intended to cover these modifications and variations of embodiments of this application provided that they fall within the scope of protection defined by the following claims and their equivalent technologies.

The invention claimed is:

1. A signal processing method for a communication apparatus, the method comprising:

mapping an input signal to N1 resource patches (RPs), each RP of the N1 RPs comprises one or more resource elements (REs), the each RP comprises one signal vector determined based on the input signal, wherein N1 is a positive integer;

inputting N1 signal vectors to an input layer of a neural network for dimension increase processing to obtain N2 high-dimensional signal vectors;

inputting the N2 high-dimensional signal vectors to an interaction layer of the neural network to obtain a feature between the N2 high-dimensional signal vectors and a feature of each high-dimensional signal vector, wherein N2 is a positive integer; and inputting the feature between the N2 high-dimensional signal vectors and the feature of each high-dimensional signal vector to an output layer of the neural network for an operation, to obtain an output signal vector.

2. The method according to claim 1, wherein the interaction layer of the neural network comprises L interaction module groups, each interaction module group comprises a first interaction module and a second interaction module, L is an integer greater than or equal to 1, the first interaction module is configured to obtain the feature between the N2 high-dimensional signal vectors, and the second interaction module is configured to obtain the feature of each high-dimensional signal vector;

an interaction module group l comprises a first interaction module l_1 and a second interaction module l_2, wherein the interaction module group/belongs to the L interaction module groups; and in the interaction module group l, input of the first interaction module l_1 is any one of the high-dimensional signal vector, output of a second interaction module l-1_2 in an interaction module group l-1, or output of a first interaction module l-1_1 in an interaction module group l-1, and input of the second interaction module l_2 is output of the first interaction module l_1; or in the interaction module group l, input of the second interaction module l_2 is any one of the high-dimensional signal vector, output of a first interaction module l-1_1 in an interaction module group l-1, or output of a second interaction module l-1_2 in an interaction module group l-1, and input of the first interaction module l_1 is output of the second interaction module l_2.

3. The method according to claim 2, wherein the first interaction module comprises an operation of an attention layer and the second interaction module comprises an operation of a fully connected layer.

4. The method according to claim 3, wherein an operation performed by the attention layer on the N2 high-dimensional signal vectors satisfies the formula:

$$ATT(Q, K, V) = softmax\left(\frac{QK^T}{\sqrt{d_k}}\right)V$$

wherein $Q=SW^Q$, $K=SW^K$, $V=SW^V$, S is input of the attention layer, $W^Q$, $W^K$, and $W^V$ are obtained through training, $d_k$ is a dimension of the high-dimensional signal vector, $^T$ represents a matrix transpose operation, ATT (Q, K, V) represents output of the attention layer; Q, K, and V represent results obtained by performing three linear transformations on input S, Q represents a query vector, $W^Q$ represents a query vector weight, K represents a keyword vector, $W^K$ represents a keyword vector weight, V represents a value vector, and $W^V$ represents a value vector weight.

5. The method according to claim 3, wherein an operation performed by the fully connected layer on the N2 high-dimensional signal vectors satisfies the formula:

$$y = f\left(xW^M + b\right)$$

wherein y is the feature of each high-dimensional signal vector, f is an activation function, $W^M$ and b are obtained through training, $W^M$ represents a weight of the fully connected layer, b represents an offset of the fully connected layer, and x is input of the fully connected layer.

6. The method according to claim 2, wherein an operation performed by the first interaction module is based on a first matrix, the first matrix is an N2×N2 matrix, and an operation performed by the second interaction module is based on a second matrix, the second matrix is a $d_k \times d_k$ matrix, and $d_k$ is a dimension of the high-dimensional signal vector.

7. The method according to claim 6, wherein elements on a main diagonal of the first matrix are the same, elements of the first matrix other than the elements on the main diagonal are the same, or the first matrix is obtained through calculation based on the input N2 high-dimensional signal vectors.

8. The method according to claim 1, wherein the interaction layer of the neural network comprises a graph neural network, and the inputting the N2 high-dimensional signal vectors to an interaction layer of the neural network to obtain the feature between the N2 high-dimensional signal vectors and the feature of the each high-dimensional signal vector comprises:

setting each of the N2 high-dimensional signal vectors to a state of a node in the graph neural network at a $0^{th}$ time, wherein each node corresponds to one high-dimensional signal vector; and the feature between the N2 high-dimensional signal vectors is an aggregated state of an adjacent node of each node in the graph neural network obtained at a $Z^{th}$ time, a state of each high-dimensional signal vector is a state of each node at the $Z^{th}$ time, and the state of each node at the $Z^{th}$ time is obtained based on the aggregated state obtained at the $Z^{th}$ time and a state of each node at a $(Z-1)^{th}$ time, wherein Z is an integer greater than or equal to 1.

9. The method according to claim 1, wherein a quantity of RES comprised in each RP is determined based on a computing resource available to the communication apparatus and/or a physical resource occupied by the input signal.

10. The method according to claim 1, wherein a RP configuration comprises three parameters that respectively correspond to a frequency domain, a time domain, and a space domain; and the RP configuration is associated with at least one of a time domain resource, a frequency domain resource, and a space domain resource that are occupied by the input signal, and the computing resource available to the communication apparatus.

11. The method according to claim 10, wherein the RP configuration is indicated by a network device.

12. The method according to claim 10, further comprising:

sending, by the communication apparatus, configuration information of a recommended RP to the network device.

13. The method according to claim 1, wherein an operation performed by the interaction layer is further based on a task vector, and the task vector is for obtaining high-dimensional task information; and the output signal vector further comprises target task information, and the target task information is obtained based on the high-dimensional task information.

14. The method according to claim 1, wherein the operation performed by the interaction layer is further based on a trainable vector, and the trainable vector is for obtaining global information of the N2 high-dimensional signal vectors; and the output signal vector is determined based on the feature between the N2 high-dimensional signal vectors, the feature of each high-dimensional signal vector, and the global information.

15. The method according to claim 1, wherein the input signal comprises data received by the communication apparatus, and the output signal vector comprises a log-likelihood ratio of the data.

16. The method according to claim 1, wherein the input signal comprises a modulation symbol, and the output signal vector comprises a transmission symbol.

17. The method according to claim 1, wherein the input signal comprises a to-be-encoded bit, and the output signal vector comprises an encoded bit or a transmission symbol.

18. A communication apparatus, comprising:

a processor; and a transceiver coupled to the processor;

the transceiver being configured to obtain an input signal; and the processor being configured to:

map the input signal to N1 resource patches (RPs), wherein the each RP of the N1 RPs comprises one or more resource elements (REs), the each RP comprises one signal vector determined based on the input signal;

input N1 signal vectors to an input layer of a neural network for dimension increase processing to obtain N2 high-dimensional signal vectors;

input the N2 high-dimensional signal vectors to an interaction layer of the neural network to obtain a feature between the N2 high-dimensional signal vectors and a feature of each high-dimensional signal vector; and input the feature between the N2 high-dimensional signal vectors and the feature of each high-dimensional signal vector to an output layer of the neural network for an operation, to obtain an output signal vector.

19. The apparatus according to claim 18, wherein the interaction layer of the neural network comprises at least one interaction module group, and each interaction module group comprises a first interaction module and a second interaction module;

the first interaction module is configured to obtain the feature between the N2 high-dimensional signal vectors, and the second interaction module is configured to obtain the feature of each high-dimensional signal vector;

an interaction module group/comprises a first interaction module l_1 and a second interaction module l_2, wherein the interaction module group l belongs to the L interaction module groups; and in the interaction module group l, input of the first interaction module l_1 is any one of the high-dimensional signal vector, output of a second interaction module l-1_2 in an interaction module group l-1, or output of a first interaction module l-1_1 in an interaction module group l-1, and input of the second interaction module l_2 is output of the first interaction module l_1; or in the interaction module group l, input of the second interaction module l_2 is any one of the high-dimensional signal vector, output of a first interaction module l-1_1 in an interaction module group l-1, or output of a second interaction module l-1_2 in an interaction module group l-1, and input of the first interaction module l_1 is output of the second interaction module l_2.

20. The apparatus of claim 19, wherein the first interaction module comprises an operation of an attention layer and the second interaction module comprises an operation of a fully connected layer.

* * * * *